(12) United States Patent
Ding

(10) Patent No.: US 11,511,524 B2
(45) Date of Patent: Nov. 29, 2022

(54) ENERGY-EFFICIENT WINDOW COATINGS TRANSMISSIBLE TO WIRELESS COMMUNICATION SIGNALS AND METHODS OF FABRICATING THEREOF

(71) Applicant: LabForInvention, Fremont, CA (US)

(72) Inventor: Guowen Ding, San Jose, CA (US)

(73) Assignee: Labforinvention, Fremont, CA (US)

( * ) Notice: Subject to any disclaimer, the term of this patent is extended or adjusted under 35 U.S.C. 154(b) by 0 days.

(21) Appl. No.: 17/198,796

(22) Filed: Mar. 11, 2021

(65) Prior Publication Data

US 2021/0283884 A1    Sep. 16, 2021

Related U.S. Application Data

(60) Provisional application No. 63/027,111, filed on May 19, 2020, provisional application No. 62/988,268, filed on Mar. 11, 2020.

(51) Int. Cl.
| | | |
|---|---|---|
| *C03C 17/36* | (2006.01) | |
| *B32B 17/10* | (2006.01) | |
| *B32B 3/26* | (2006.01) | |

(52) U.S. Cl.
CPC .. *B32B 17/10201* (2013.01); *B32B 17/10192* (2013.01); *B32B 17/10403* (2013.01);
(Continued)

(58) Field of Classification Search
CPC .............. C03C 17/366; C03C 17/3642; C03C 17/3644; C03C 17/3647; C03C 17/3681;
(Continued)

(56) References Cited

U.S. PATENT DOCUMENTS

| | | |
|---|---|---|
| 3,837,907 A | 9/1974 | Berglund et al. |
| 5,364,685 A | 11/1994 | Nakashima et al. |
| (Continued) | | |

FOREIGN PATENT DOCUMENTS

| | | | |
|---|---|---|---|
| EP | 3309343 B1 * | 5/2019 | ............ C03C 17/36 |
| FI | 127500 B | 7/2018 | |
| (Continued) | | | |

OTHER PUBLICATIONS

International Application Serial No. PCT/US21/21891, Search Report and Written Opinion dated May 20, 2021, 7 pgs.

*Primary Examiner* — Z. Jim Yang
(74) *Attorney, Agent, or Firm* — Polygon IP, LLP

(57) ABSTRACT

Provided are novel energy-efficient signal-transparent window assemblies and methods of fabricating thereof. These window assemblies are specifically configured to allow selective penetration of electromagnetic wavelengths greater than 0.5 millimeters, representing current and future wireless signal spectrum. This signal penetration is provided while IR blocking properties are retained. Furthermore, the windows assemblies remain substantially transparent within the visible spectrum with no specific features detectable to the naked eye. This unique performance is achieved by patterning conductive layers such that the conductive layer edges remain protected during most fabrication steps and the fabrication. As such, the conductive layers are encapsulated and being separated from the environment while retaining separation between individual disjoined structures of these layers. For example, a barrier layer and/or a dielectric layer may extend over the conductive layer edge. The patterning is achieved by forming photoresist structures on the substrate and depositing a low-E stack over these photoresist structures.

20 Claims, 17 Drawing Sheets

(52) U.S. Cl.
CPC ........ *C03C 17/366* (2013.01); *C03C 17/3618* (2013.01); *B32B 3/266* (2013.01); *B32B 17/10* (2013.01); *B32B 2250/05* (2013.01); *B32B 2307/202* (2013.01); *B32B 2307/204* (2013.01); *B32B 2419/00* (2013.01); *Y10T 428/24612* (2015.01)

(58) Field of Classification Search
CPC ........ G02B 5/204; G02B 5/208; G02B 5/281; G02B 5/282; G02B 5/284; B32B 3/26–30; B32B 3/14–22; Y10T 428/24273–24339; Y10T 428/24355–24364; Y10T 428/24479; Y10T 428/24521–24545; Y10T 428/2457; Y10T 428/24612; Y10T 428/2462; Y10T 428/24628; Y10T 428/24653; Y10T 428/24669; Y10T 428/24694; Y10T 428/24711–24727; Y10T 428/24802; Y10T 428/24851; Y10T 428/24868; Y10T 428/24917; Y10T 428/16; Y10T 428/161; Y10T 428/162; Y10T 428/163; Y10T 428/168
See application file for complete search history.

(56) References Cited

U.S. PATENT DOCUMENTS

| | | | | |
|---|---|---|---|---|
| 6,027,815 | A * | 2/2000 | Hsu | C03C 17/3435 65/60.8 |
| 6,395,398 | B1 * | 5/2002 | Nakashima | C03C 17/3607 428/323 |
| 6,730,389 | B2 | 5/2004 | Voeltzel | |
| 8,927,069 | B1 | 1/2015 | Estinto et al. | |
| 9,587,303 | B2 | 3/2017 | Palacios-Laloy | |
| 10,978,777 | B1 * | 4/2021 | Jiang | B32B 17/10229 |
| 2003/0080909 | A1 * | 5/2003 | Voeltzel | B32B 17/10174 343/713 |
| 2008/0145661 | A1 * | 6/2008 | Medwick | B32B 17/10174 428/409 |
| 2008/0279498 | A1 * | 11/2008 | Sampsell | G02B 26/0841 385/14 |
| 2009/0128893 | A1 * | 5/2009 | McCarthy | G02B 5/3058 977/932 |
| 2011/0135880 | A1 * | 6/2011 | Roman | C03C 17/366 204/192.12 |
| 2012/0207951 | A1 * | 8/2012 | Walp | B23K 26/324 29/458 |
| 2012/0207952 | A1 * | 8/2012 | Walp | C03C 17/34 29/458 |
| 2014/0370208 | A1 * | 12/2014 | Walp | C03C 17/36 65/56 |
| 2014/0370209 | A1 * | 12/2014 | Walp | B32B 17/10266 65/41 |
| 2015/0093554 | A1 * | 4/2015 | Estinto | C03C 17/06 428/210 |
| 2015/0202719 | A1 * | 7/2015 | Wohlfeil | B23K 26/0006 428/209 |
| 2015/0229030 | A1 * | 8/2015 | Dai | C03C 27/10 219/203 |
| 2015/0234104 | A1 * | 8/2015 | Lienhart | G02B 5/208 264/2.7 |
| 2015/0369980 | A1 * | 12/2015 | Ockenfuss | H01L 27/14685 359/359 |
| 2016/0201189 | A1 * | 7/2016 | Palacios-Laloy | C23C 14/0641 136/256 |
| 2016/0340233 | A1 * | 11/2016 | Jin | H05K 1/03 |
| 2018/0036839 | A1 | 2/2018 | Estinto et al. | |
| 2018/0222793 | A1 * | 8/2018 | Ridealgh | C03C 17/3417 |
| 2020/0048958 | A1 * | 2/2020 | Kum | B32B 7/12 |
| 2021/0041612 | A1 * | 2/2021 | Cleary | G02B 5/284 |
| 2021/0116713 | A1 * | 4/2021 | Chen | H01L 31/02325 |
| 2021/0129495 | A1 * | 5/2021 | Asai | B60J 1/002 |
| 2021/0197530 | A1 * | 7/2021 | Diguet | B32B 27/36 |
| 2022/0073424 | A1 * | 3/2022 | Maillaud | C03B 23/0307 |
| 2022/0194846 | A1 * | 6/2022 | Borrelli | C03C 17/3649 |

FOREIGN PATENT DOCUMENTS

| | | | |
|---|---|---|---|
| JP | H06247745 A | 9/1994 | |
| JP | 2862452 B2 | 3/1999 | |
| JP | 2005104793 A * | 4/2005 | ............ B32B 17/10 |
| WO | 2013122181 A1 | 8/2013 | |
| WO | 2014033007 A1 | 3/2014 | |
| WO | 2014126135 A1 | 8/2014 | |
| WO | 2016205104 A1 | 12/2016 | |
| WO | WO-2016192569 A2 * | 12/2016 | ............ C03C 17/36 |
| WO | WO-2020216514 A1 * | 10/2020 | ........ C03C 17/3435 |
| WO | WO-2021176294 A1 * | 9/2021 | ....... B32B 17/10174 |

* cited by examiner

Deposit Photoresist

UV Exposure

Develop and Clean

ENERGY-EFFICIENT WINDOW COATINGS TRANSMISSIBLE TO WIRELESS COMMUNICATION SIGNALS AND METHODS OF FABRICATING THEREOF

CROSS-REFERENCE TO RELATED APPLICATIONS

This application claims the benefit under 35 U.S.C. § 119(e) of U.S. Provisional Patent Application 62/988,268, filed on 11 Mar. 2020, and also of U.S. Provisional Patent Application 63/027,111, filed on 19 May 2020, both of which are incorporated herein by reference in their entirety for all purposes.

BACKGROUND

Windows tend to be the least energy-efficient component in buildings. For example, radiation-based heat transfer represents about 60% of the total energy loss through standard windows. Energy-efficient windows utilize special coatings to reduce this heat transfer, e.g., by blocking the IR (infrared) radiation, corresponding to wavelengths between 5 micrometers to 50 micrometers. However, energy-efficient windows also tend to block wireless communication signals with wavelengths longer than 50 micrometers or even longer than 0.5 millimeters. This signal blocking negatively impacts cellular reception, Wi-Fi access, and the like. Conventional approaches use external antennas to rebroadcast signals inside the building. However, such systems are complex, expensive, and provide minimal coverage inside the buildings. Furthermore, covering all areas inside the building with such systems can be difficult.

SUMMARY

Provided are novel energy-efficient signal-transparent window assemblies and methods of fabricating thereof. These window assemblies are specifically configured to allow selective penetration of millimeter waves, representing current and future wireless signal spectrum. This signal penetration is provided while IR blocking properties are retained. Furthermore, the window assemblies remain substantially transparent within the visible spectrum with no specific features detectable to the naked eye. This unique performance is achieved by patterning conductive layers such that the conductive layer edges remain protected during most fabrication steps and the fabrication. As such, the conductive layers are encapsulated and separated from the environment while retaining separation between individual disjoined structures of these layers. For example, a barrier layer and/or a dielectric layer may extend over the conductive layer edge. The patterning is achieved by forming photoresist structures on the substrate and depositing a low-E stack over these photoresist structures.

In some examples, an energy-efficient signal-transparent window assembly comprises a window substrate, non-conductive spacers, a first dielectric layer, a conductive layer, a barrier layer, and a second dielectric layer. The non-conductive spacers form a pattern on the window substrate, interfacing a portion of the window substrate, and blocking the portion of the window substrate. The first dielectric layer interfaces the window substrate and the non-conductive spacers. The conductive layer is disposed over the first dielectric layer such that the first dielectric layer is disposed between the conductive layer and each of the window substrate and the non-conductive spacers. The conductive layer is formed by multiple disjoined structures defined by the pattern of the non-conductive spacers. The barrier layer is disposed over the conductive layer such that the conductive layer is disposed between the first dielectric layer and the barrier layer. The second dielectric layer is disposed over the barrier layer such that the barrier layer is positioned between the second dielectric layer and the conductive layer, such that the first dielectric layer, the conductive layer, the barrier layer, and second dielectric layer form a stack at least over a portion of the window substrate. Each of the first dielectric layer and the second dielectric layer is either a uniform monolithic structure or a multi-layered structure.

In some examples, the non-conductive spacers comprise at least one of photoresist, fibers, wires, and transparent material. For example, the non-conductive spacers comprise a positive photoresist.

In some examples, the first dielectric layer, the conductive layer, the barrier layer, and the second dielectric layer form substrate-interfacing stacks and spacer-interfacing stacks. Each of the substrate-interfacing stacks interfaces the window substrate and is positioned between two adjacent ones of the non-conductive spacers. The spacer-interfacing stacks are positioned such that the non-conductive spacers are disposed between the spacer-interfacing stacks and the window substrate. The substrate-interfacing stacks may be disjoined from the spacer-interfacing stacks. In some examples, the non-conductive spacers protrude between and above the substrate-interfacing stacks. For example, the non-conductive spacers have a height at least greater than the height of the substrate-interfacing stacks.

In some examples, each of the non-conductive spacers has a substrate-interfacing surface and a dielectric-interfacing surface, opposite of the substrate-interfacing surface. The width of the dielectric-interfacing surface is larger than the width of the substrate-interfacing surface. For example, the difference between the width of the dielectric-interfacing surface and the width of the substrate-interfacing surface is at least 100 nanometers.

In some examples, each of the non-conductive spacers comprises a spacer base and a spacer head. The spacer base defines the first spacer surface. The spacer head defines the second spacer surface and is formed from a material different than the spacer base.

In some examples, each of the non-conductive spacers is disposed between two adjacent sidewalls, each extending to the window substrate and formed by at least one of the barrier layer and the second dielectric layer. For example, each of the two adjacent sidewalls is formed at least by both the barrier layer and the second dielectric layer. In some examples, each of the two adjacent sidewalls has a sidewall surface, facing a corresponding one of the non-conductive spacers. The sidewall surface is separated from the conductive layer by at least 2 nanometers.

In some examples, the first dielectric layer, the conductive layer, the barrier layer, and the second dielectric layer form substrate-interfacing stacks and spacer-interfacing stacks. Each of the substrate-interfacing stacks and spacer-interfacing stacks is covered by one or more additional stacks, each comprising the first dielectric layer, the conductive layer, the barrier layer, and the second dielectric layer.

In some examples, the energy-efficient signal-transparent window assembly further comprises a patterned portion and a non-patterned portion. The conductive layer is formed by the multiple disjoined structures in the patterned portion. The conductive layer is a continuous structure in the non-patterned portion.

In some examples, an energy-efficient signal-transparent window assembly comprises a window substrate, a first dielectric layer, a conductive layer, a barrier layer, and a second dielectric layer. The first dielectric layer is disposed over the window substrate. The conductive layer is disposed over the first dielectric layer such that the first dielectric layer is disposed between the conductive layer and the window substrate. The conductive layer is formed by multiple disjoined structures defined by openings forming a pattern, wherein each of the openings is disposed between two adjacent sidewalls. The barrier layer is disposed over the conductive layer such that the conductive layer is disposed between the first dielectric layer and the barrier layer. The second dielectric layer is disposed over the barrier layer such that the barrier layer is positioned between the second dielectric layer and the conductive layer. The first dielectric layer, the conductive layer, the barrier layer, and the second dielectric layer form a substrate-interfacing stack at least over a portion of the window substrate. Each of the two adjacent sidewalls extends to the window substrate and is formed by at least one of the barrier layer and the second dielectric layer. Each of the first dielectric layer and the second dielectric layer is either a uniform monolithic structure or a multi-layered structure.

In some examples, a portion of the window substrate between the two adjacent sidewalls is exposed. For example, the portion of the window substrate between the two adjacent sidewalls is planar and substantially intact. In some examples, each of the two adjacent sidewalls is formed at least by both the barrier layer and the second dielectric layer.

In some examples, each of the two adjacent sidewalls has a sidewall surface, facing another of the two adjacent sidewalls. The sidewall surface is separated from the conductive layer by at least 2 nanometers.

In some examples, a method of forming an energy-efficient signal-transparent window assembly comprises forming a pattern of non-conductive spacers on a window substrate. The method proceeds with depositing a stack over the window substrate and the non-conductive spacers. The stack comprises a first dielectric layer, a conductive layer, a barrier layer, and a second dielectric layer. The conductive layer comprises multiple disjoined structures defined by the pattern of the non-conductive spacers.

In some examples, the pattern of the non-conductive spacers is formed using at least one of (a) photolithography, such that the non-conductive spacers comprise photoresist, (b) imprint lithography, and (c) mechanical placement of the non-conductive spacers. Furthermore, in some examples, forming the pattern of the non-conductive spacers comprises forming undercuts in the non-conductive spacers, such that each of the non-conductive spacers has a substrate-interfacing surface and a dielectric-interfacing surface, opposite of the substrate-interfacing surface and such that a width of the dielectric-interfacing surface is a larger than a width of the substrate-interfacing surface.

In some examples, each of the non-conductive spacers comprises a spacer base and a spacer head such that the spacer base and the spacer head are formed from different materials having different etching rates. The undercuts are formed due to the different etching rates of the spacer base and the spacer head.

In some examples, the method further comprises tempering the energy-efficient signal-transparent window assembly such that the non-conductive spacers are removed during tempering. In some examples, depositing the stack comprises forming two adjacent sidewalls around each of the non-conductive spacers such that each of the two adjacent sidewalls extends to the window substrate and is formed by at least one of the barrier layer and the second dielectric layer.

These and other examples are described further below with reference to the figures.

BRIEF DESCRIPTION OF THE DRAWINGS

FIGS. 6A-6D are schematic cross-sectional views of various stages of the method while forming non-conductive spacers of an energy-efficient signal-transparent window assembly, in accordance with some examples.

DETAILED DESCRIPTION

Figure 1A:
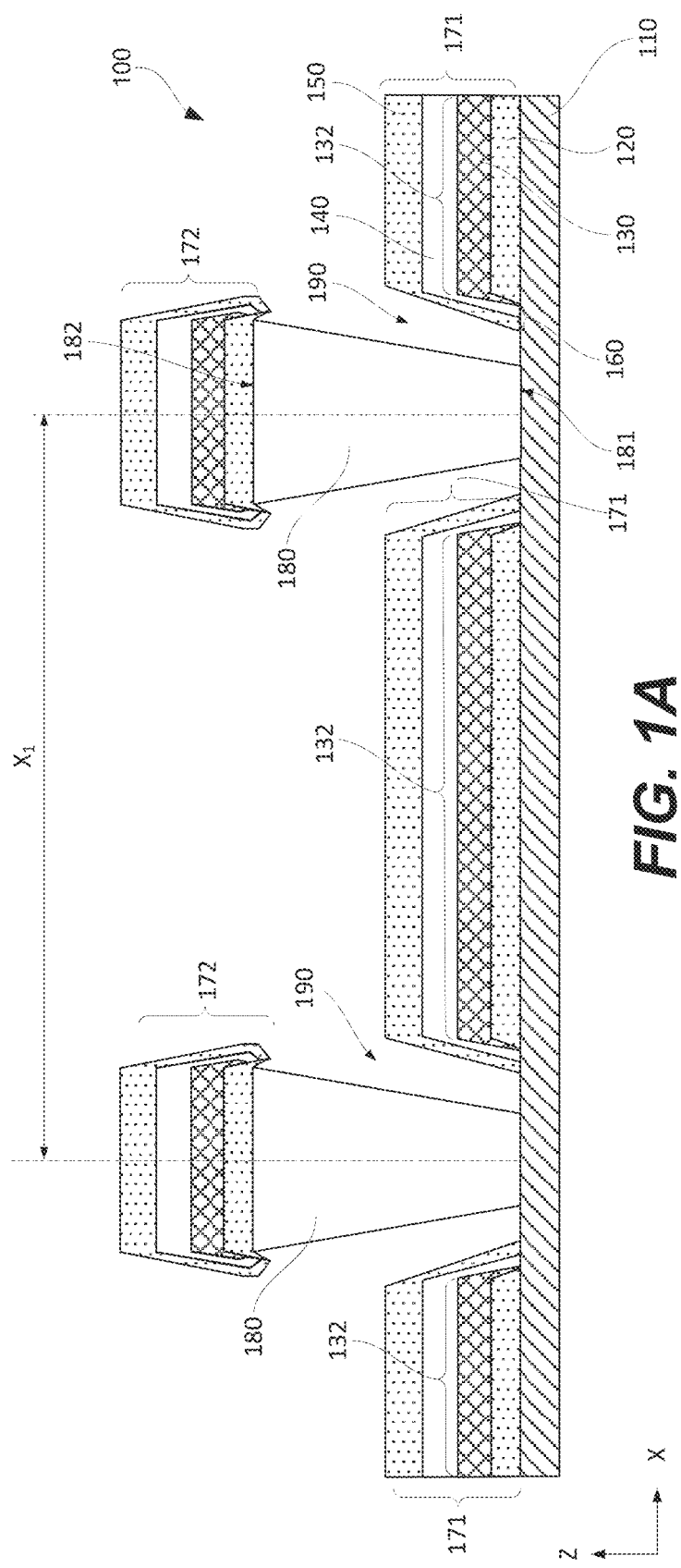
FIG. 1A is a schematic cross-sectional view of an energy-efficient signal-transparent window assembly, comprising non-conductive spacers and low-E stacks positioned at different levels relative to the window substrate, in accordance with some examples.

In the following description, numerous specific details are outlined in order to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Introduction

Energy-efficient windows are becoming more popular in commercial and residential buildings as well as other applications. An energy-efficient window may comprise one or more silver-based layers, responsible for blocking IR radiation, in addition to various dielectric layers and barrier layers. These silver-based layers may be also referred to as metal layers or conductive layers. However, energy-efficient windows or, more specifically, silver-based layers tend to interfere with the wireless signal transmission (e.g., cellular signal) due to signal attenuation. As noted above, conventional solutions involve the installation of distributed antenna systems (DAS) within buildings to promote signal propagation. However, this approach requires special equipment, additional power consumption, and additional cost.

It has been found that using separating a conductive layer into multiple disjoined structures helps to reduce signal attenuation. It should be noted that the wavelength of electromagnetic waves, which can pass through this patterned conductive layer, depends on the opening size between the disjoined structures. More specifically, the wavelength depends on the opening width between pairs of adjacent disjoined structures, e.g., the largest opening width is smaller than the wavelength. For example, a continuous conductive layer may be formed over the substrate and subsequently patterned, e.g., removing small portions of this conductive layer and forming top-to-bottom/through openings (e.g., extending to the substrate). However, the patterning process and subsequent exposure of conductive layer edges (within the openings) cause various durability issues with these silver-based conductive layers as well as aesthetics issues (e.g., unsightly visible line marks). As a result, patterning methods have not been widely adopted. Furthermore, patterning becomes very challenging when dealing with the $5^{th}$ generation (5G) networks using wavelengths greater than 1 millimeter. Such wavelengths require openings smaller than 0.1 millimeters in width to achieve adequate signal transmission. Future generation networks are expected to use even shorter wavelength requiring smaller openings, which may be challenging to achieve with conventional laser scribing techniques.

Described herein are various examples of energy-efficient signal-transparent window assemblies and methods of fabricating thereof. These assemblies are transparent in the visible light region, allowing penetration of the electromagnetic waves at set wavelengths (e.g., carrying wireless communication signals), and are configured to block the IR radiation. For example, the transparency in the visible light region (e.g., wavelength 350-800 nanometers) may be between 10% and 100% transmission. In the same or other examples, the energy-efficient signal-transparent window assemblies allow penetration of the electromagnetic waves having a wavelength of 12.5 centimeters (corresponding to 2.4 GHz frequency) at only around 5 dB extra loss than that of an uncoated window substrate. Furthermore, the IR-blocking/emissivity is less than 0.15 in some examples. This value indicates that more than 85% of spectra between wavelength 5 micrometers to 50 micrometers is blocked by an energy-efficient signal-transparent window assembly. For comparison, conventional low-E windows (e.g., a sample from AGC Glass North America Alpharetta, Ga.) were reported around 30 DB signal loss measured from 1 GHz to 5 GHz.

Furthermore, the energy-efficient signal-transparent window assemblies described herein do not have unsightly visible marks and have a pleasant aesthetic appearance, unlike laser-patterned low-E windows. For example, when a window assembly is inspected at an angle of 90° to its surface with a uniform backlight simulating daylight (e.g., light intensity 10,000 lux or above), no visible marks can be observed without magnification (i.e., not observable with the "naked eye"). Furthermore, a digital photo, with a pixel density of 150,000 pixels per centimeter-square also does not show any visible marks.

The energy-efficient signal-transparent window assemblies described herein also have long-term durability. For example, an accelerated durability test, which involves dipping a sample into boiling water for one hour, does not reveal any visible marks with the inspection criteria presented above (e.g., the "naked eye" inspection and digital photo). Furthermore, no additional defects, which are attributable to this accelerated durability test, were detected under the microscope. Another accelerated durability was performed by baking a sample in a 650° C. oven for 8 minutes. Likewise, the microscope inspection did not reveal any additional defects.

Finally, the energy-efficient signal-transparent window assemblies allow wireless signal propagation of 5G signals (frequency of 6 GHz corresponding to 50-millimeter wavelength) and other like signals (e.g., future generation using higher frequencies and smaller wavelengths). In some examples, the opening width is 0.1 millimeters or even less, which much smaller than the wavelength of these communication technologies.

Examples of Energy-Efficient Signal-Transparent Window Assemblies

FIG. 1A illustrates one example of energy-efficient signal-transparent window assembly 100, comprising window substrate 110, first dielectric layer 120, conductive layer 130, barrier layer 140, and second dielectric layer 150. In this example, energy-efficient signal-transparent window assembly 100 also comprises non-conductive spacers 180, which forms pattern 185 on window substrate 110. Various examples of pattern 185 are described below with reference to FIGS. 4A and 4B. Non-conductive spacers 180 interface a portion of window substrate 110 and block this portion of window substrate 110.

First dielectric layer 120 is disposed over window substrate 110 and non-conductive spacers 180. More specifically, a first portion of first dielectric layer 120 interfaces window substrate 110, while a second portion of first dielectric layer 120 interfaces non-conductive spacers 180. In this example, non-conductive spacers 180 are positioned between the second portion of first dielectric layer 120 and window substrate 110 thereby separating the second portion of first dielectric layer 120 from window substrate 110. As such, the first portion of first dielectric layer 120 and the second portion of first dielectric layer 120 are not so-planar. Instead, the first portion of first dielectric layer 120 and the second portion of first dielectric layer 120 are offset from each other by the height (along the Z-axis) of non-conductive spacers 180. Furthermore, in some examples, the first portion of first dielectric layer 120 is disjoined from the second portion of first dielectric layer 120. In other words, the first portion of first dielectric layer 120 does not directly contact the second portion of first dielectric layer 120.

Conductive layer 130 is disposed over first dielectric layer 120 such that first dielectric layer 120 is positioned between conductive layer 130 and each of window substrate 110 and non-conductive spacers 180. Conductive layer 130 is formed by multiple disjoined structures 132, defined by pattern 185 of non-conductive spacers 180. For example, a first set of multiple disjoined structures 132 are disposed over the first portion of first dielectric layer 120, which interfaces window substrate 110. A second set of multiple disjoined structures 132 are disposed over the second portion of first dielectric layer 120, which interfaces non-conductive spacers 180. As with the first and second portions of first dielectric layer 120, the first and second sets of multiple disjoined structures 132 are non-planar and are offset from each other by the height (along the Z-axis) of non-conductive spacers 180. It should be noted that multiple disjoined structures 132 allows transmission of electromagnetic waves through energy-efficient signal-transparent window assembly 100 as noted above.

Barrier layer 140 is disposed over conductive layer 130 such that conductive layer 130 is disposed between first dielectric layer 120 and barrier layer 140. Similar to first dielectric layer 120 and conductive layer 130, in some examples, barrier layer 140 comprises a first portion and a second portion. The first portion of barrier layer 140 is disposed over the first set of multiple disjoined structures 132, which are disposed over the first portion of first dielectric layer 120, which interfaces window substrate 110. The second portion of barrier layer 140 is disposed over the second set of multiple disjoined structures 132, which are disposed over the second portion of first dielectric layer 120, which interfaces non-conductive spacers 180.

Finally, second dielectric layer 150 is disposed over barrier layer 140 such that barrier layer 140 is positioned between second dielectric layer 150 and conductive layer 130. Similar to other components of energy-efficient signal-transparent window assembly 100, second dielectric layer 150 comprises a first portion and a second portion. The first portion of second dielectric layer 150 is disposed over the first portion of barrier layer 140. The second portion of second dielectric layer 150 is disposed over the second portion of barrier layer 140.

As such, first dielectric layer 120, conductive layer 130, barrier layer 140, and second dielectric layer 150 collectively form different types of stacks over window substrate 110, which may be referred to as substrate-interfacing stacks 171 and spacer-interfacing stacks 172. Substrate-interfacing stacks 171 is formed by the first portion of first dielectric layer 120, the first set of multiple disjoined structures 132, the first portion of barrier layer 140, and the first portion of second dielectric layer 150. As noted above, the first portion of first dielectric layer 120 interfaces window substrate 110. Spacer-interfacing stacks 172 are formed by the second portion of first dielectric layer 120, the second set of multiple disjoined structures 132, the second portion of barrier layer 140, and the second portion of second dielectric layer 150. As noted above, the second portion of first dielectric layer 120 interfaces non-conductive spacers 180. The number of these stacks depend on pattern 185 formed by non-conductive spacers 180. For example, each of non-conductive spacers 180 may have one of the corresponding spacer-interfacing stacks 172, disposed over that spacer, and two substrate-interfacing stacks 171, disposed on each side of that spacer.

The composition and other structural features of each component will not be described in more detail. In some examples, window substrate 110 comprises glass, plastics, or any materials that can support at least first dielectric layer 120, conductive layer 130, barrier layer 140, and second dielectric layer 150. In some examples, window substrate 110 is transparent.

In some examples, first dielectric layer 120 and second dielectric layer 150 are formed from the same material. Alternatively, first dielectric layer 120 and second dielectric layer 150 are formed from different materials. In general, materials suitable for first dielectric layer 120 and second dielectric layer 150 include, but are not limited to, transparent dielectric materials such as a zin-tin oxide ($Zn_xSn_yO_z$) and a silicon nitride ($Si_3N_4$). In some examples, the dielectric conductivity of the material forming first dielectric layer 120 and/or second dielectric layer 150 is smaller than 1000 S/M (Siemens per meter) or, more specifically, smaller than 1 S/M. In some examples, the extinction coefficient is less than 0.1 at 550 nm. These materials may be selected for color tuning, e.g., to make the boundary of the discontinuous layer invisible. Additional color tuning may be achieved by controlling the thickness of first dielectric layer 120 and second dielectric layer 120. For example, first dielectric layer 120 and/or second dielectric layer 150 may have a thickness of 10 nm to 100 nm. In some examples, first dielectric layer 120 and/or second dielectric layer 150 allows for vacuum break during fabrication of energy-efficient signal-transparent window assembly 100.

In some examples, each of first dielectric layer 120 and second dielectric layer 150 is a uniform monolithic layer. Alternatively, one or both first dielectric layer 120 and second dielectric layer 150 are multilayered structures. At least one layer in these multilayered structures is formed using a dielectric material.

In some examples, conductive layer 130 is configured to provide IR-blocking for energy saving while allowing penetration of signal-carrying electromagnetic waves. Some examples of materials suitable for conductive layer 130 include, but are not limited to, silver, silver alloys, copper, gold, ITO (indium tin oxide), and the like. In some examples, the sheet resistance of conductive layer 130 is smaller than 100 Ohm/square. In some examples, the thickness of conductive layer 130 is between 5 nanometers and 40 nanometers.

In some examples, conductive layer 130 is patterned or, more specifically, formed by multiple disjoined structures 132. The size of these multiple disjoined structures 132 and spacing between two adjacent ones of multiple disjoined structures 132 are set by pattern. In some examples, the width (e.g., along the X-axis in FIG. 1A) of each of multiple disjoined structures 132 is between about 0.05 millimeters and 5 millimeters or, more specifically, between about 0.1 millimeters and 2 millimeters. In the same or other examples, the spacing (e.g., along the X-axis in FIG. 1A) between adjacent of two multiple disjoined structures 132 is between about 50 nanometers and 20 micrometers or, more specifically, between about 100 nanometers and 10 micrometers. These parameters define the transmissibility of energy-efficient signal-transparent window assembly 100 to signal-carrying electromagnetic waves.

In some examples, barrier layer 140 is used to protect conductive layer 130 from the environment and degradation (e.g., to protect silver in conductive layer 130 from oxidation). The materials suitable for barrier layer 140 include, but are not limited to metals or metal oxides, such as NiCr, $NiCrO_x$, $TiO_x$, NiTiNb, and $NiTiNbO_x$. In some examples, the thickness of barrier layer 140 is between about 1 nm and 15 nm.

As noted above, non-conductive spacers 180 are used for positioning spacer-interfacing stacks 172 and substrate-interfacing stacks 171 at different levels thereby causing separations in conductive layer 130 to form multiple disjoined structures 132. In some examples, the height of non-conductive spacers 180 (e.g., along the X-axis in FIG. 1A) is at least greater than the height of substrate-interfacing stacks 171 or, more specifically, at least three times greater. For example, the height of non-conductive spacers 180 is between about 20 nanometers and 3000 nanometers or, more specifically, between about 20 nanometers and 1000 nanometers.

Non-conductive spacers 180 are positioned in openings 190, between adjacent pairs of substrate-interfacing stacks 171. It should be noted that, in some examples, these openings 190 are formed due to non-conductive spacers 180 being first positioned on window substrate 110, e.g. while forming substrate-interfacing stacks 171 and spacer-interfacing stacks 172. Non-conductive spacers 180 prevent a portion of the deposited materials from reaching window substrate 110. As such, this portion of the deposited materials forms spacer-interfacing stacks 172.

In some examples, non-conductive spacers 180 comprise at least one or photoresist, fibers, wires, various transparent materials, and other like materials and structures. For example, FIG. 1D illustrates an example in which non-conductive spacers 180 are nanofibers arranged on window substrate 110. In some examples, non-conductive spacers 180 comprise a positive photoresist, which is soluble in a photoresist developer after being directly exposed.

In some examples, non-conductive spacers 180 have a cross-sectional width of 0.1 micrometers to 20 micrometers is formed. In some examples, the electrical conductivity of non-conductive spacers 180 is less than 1000 S/M (Siemens per meter) or, more specifically, less than 1 S/M. In some examples, a patterned structure is transparent. For example, the extinction coefficient of patterned structure material is at least smaller than 0.3 at the visible region at 550 nm, specifically, small than 0.1 at 550 nm.

In some examples, non-conductive spacers 180 are spaced away from substrate-interfacing stacks 171, e.g., as shown in FIG. 1A. As such, openings 190 comprise gaps, between non-conductive spacers 180 are spaced away from substrate-interfacing stacks 171.

In some examples, non-conductive spacers 180 have tapered shapes, e.g., as shown in FIG. 1A. Specifically, each of non-conductive spacers 180 has substrate-interfacing surface 181 and dielectric-interfacing surface 182, opposite of substrate-interfacing surface 181. The width of dielectric-interfacing surface 182 is larger than the width of substrate-interfacing surface 181. In some examples, the difference between the width of dielectric-interfacing surface 182 and the width of substrate-interfacing surface 181 is at least 100 nanometers or even at least 200 nanometers. This taper helps to form the separation between disjoined structures 132 of conductive layer 130.

This taper of non-conductive spacers 180 may be achieved using various techniques. For example, non-conductive spacers 180 may be formed from two different materials, which have different etch rates during the formation of non-conductive spacers 180 using photolithography. Specifically, each of non-conductive spacers 180 comprises spacer base 188 and spacer head 189, e.g., as shown in FIG. 1C. Spacer base 188 defines substrate-interfacing surface 181. Spacer head 189 defines dielectric-interfacing surface 182 and is formed from a material, different than spacer base 188, e.g., the etch rate of the material forming spacer base 188 is greater than that forming spacer head 189.

In some examples, each of non-conductive spacers 180 is disposed between two adjacent sidewalls 160, each extending to window substrate 110 and formed by at least one of barrier layer 140 and second dielectric layer 150. Adjacent sidewalls 160 define opening 190 and face each other (and each faces the corresponding one of non-conductive spacers 180). Furthermore, sidewalls 160 protect conductive layer 130 from the environment, e.g., when opening 190 has a gap between sidewalls 160 and non-conductive spacers 180. In some examples, each of two adjacent sidewalls 160 is formed by both barrier layer 140 and second dielectric layer 150. For example, sidewalls 160 are formed in-situ, while depositing barrier layer 140 and second dielectric layer 150.

Specifically, sidewalls 160 are formed by specifically tuning the deposition processes of conductive layer 130, barrier layer 140, and second dielectric layer 150. In some examples, the sidewall thicknesses of barrier layer 140 and second dielectric layer 150 (identified as $X_1$ and $X_2$ in FIG. 1B) can be defined as the horizontal measurement corresponding to the centerline of conductive layer 130. To prevent corrosion and to improve durability, the sidewall thickness of barrier layer 140 (identified as $X_2$) is at least about 1 nm, or even at least 0.3 nm while the sidewall thickness of second dielectric layer 150 (identified as $X_2$) is at least about 10 nm, or even at least about 2 nm.

Figure 1B:
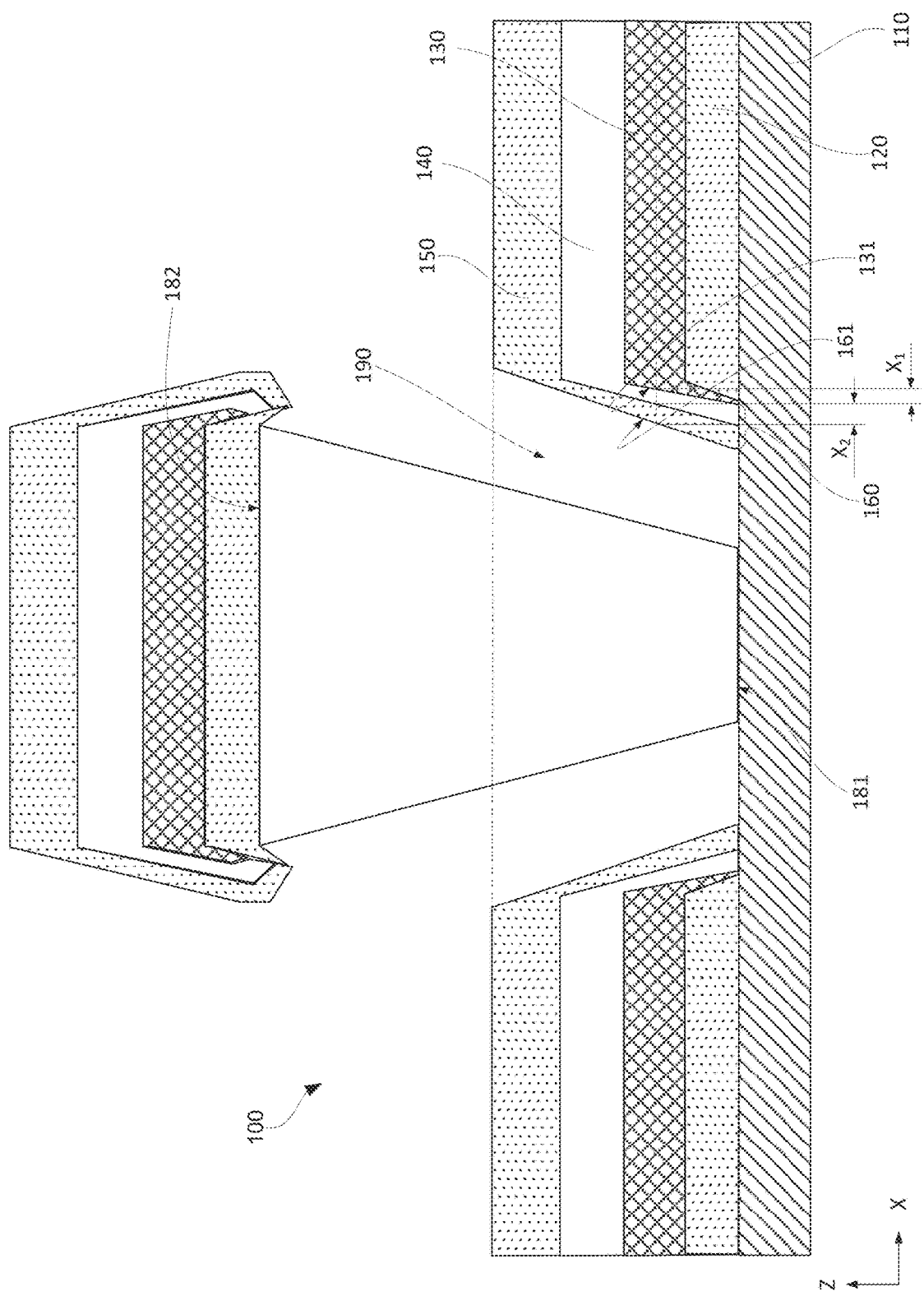
FIG. 1B is a schematic expanded view of a portion of the energy-efficient signal-transparent window assembly in FIG. 1A.
Figure 1C:
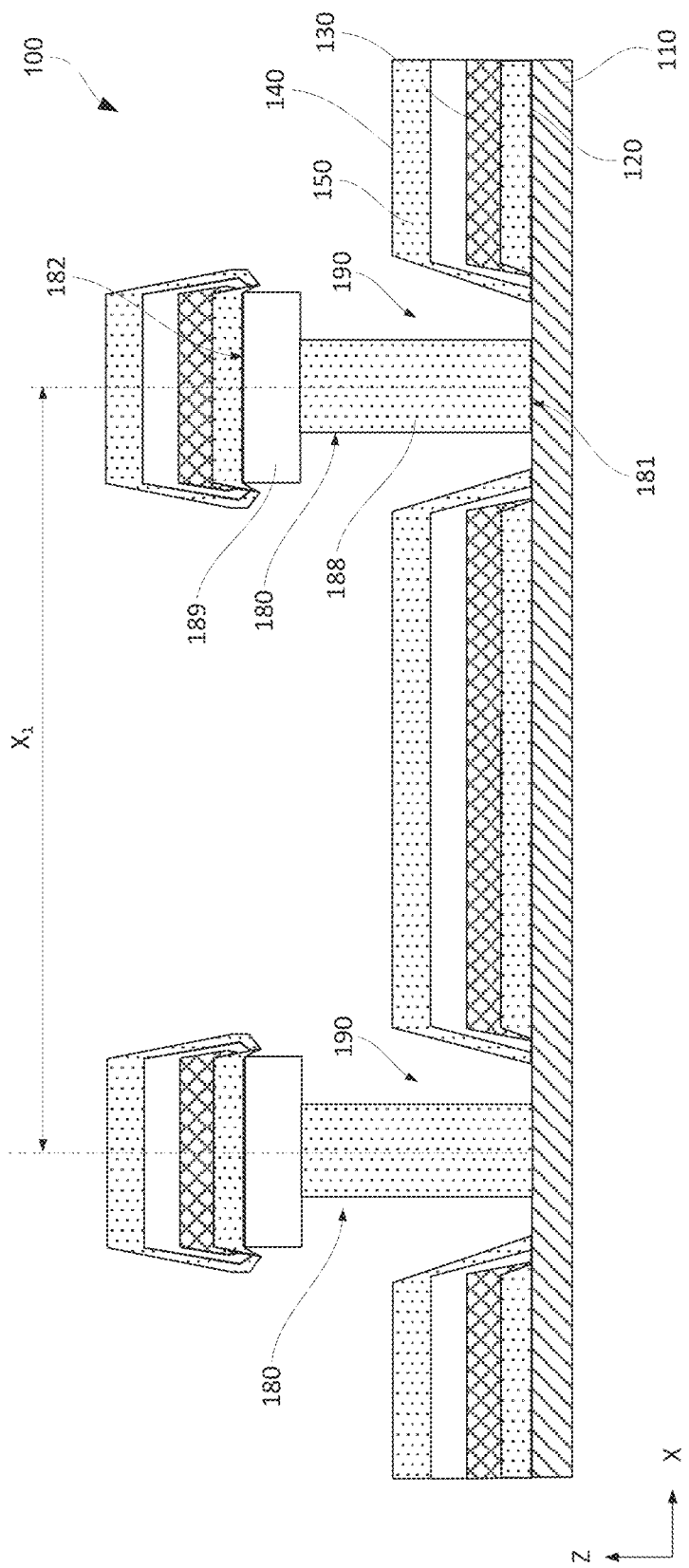
FIG. 1C is a schematic cross-sectional view of another example of the energy-efficient signal-transparent window assembly, comprising non-conductive spacers formed from two layers.
Figure 1D:
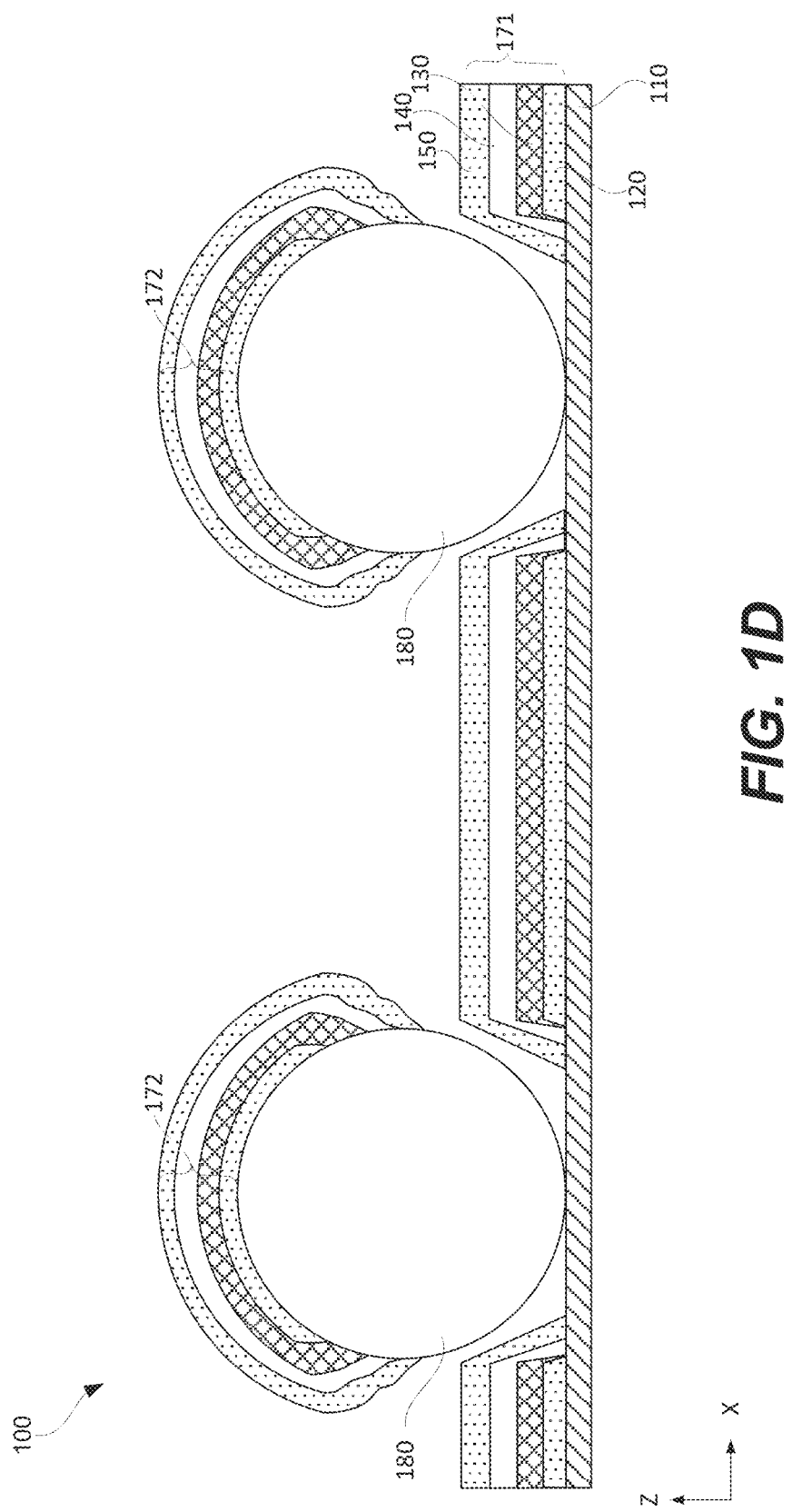
FIG. 1D is a schematic cross-sectional view of another example of the energy-efficient signal-transparent window assembly, in which the non-conductive spacers formed are wires disposed over the window substrate.

Referring to FIG. 1B, each of two adjacent sidewalls 160 has sidewall surface 161, facing the corresponding one of non-conductive spacers 180. Sidewall surface 161 is separated from conductive layer 130 by at least 2 nanometers or, more specifically, by at least 3 nanometers as the horizontal measurement corresponding to the centerline of conductive layer 130. This distance may be defined as the thickness of sidewalls 160.

In some examples, barrier layer 140 is patterned in addition to or instead of conductive layer 130. For example, barrier layer 140 may be patterned into a set of disjoined structures in a stack. When barrier layer 140 is absent or very thin (e.g., 60% of the normal thickness in the low-E structure), portions of conductive layer 130 may be exposed to the environment in this gap area. These portions may oxidize and become non-conductive. These non-conductive portions may be operable as second dielectric layer 150.

Figure 1E:
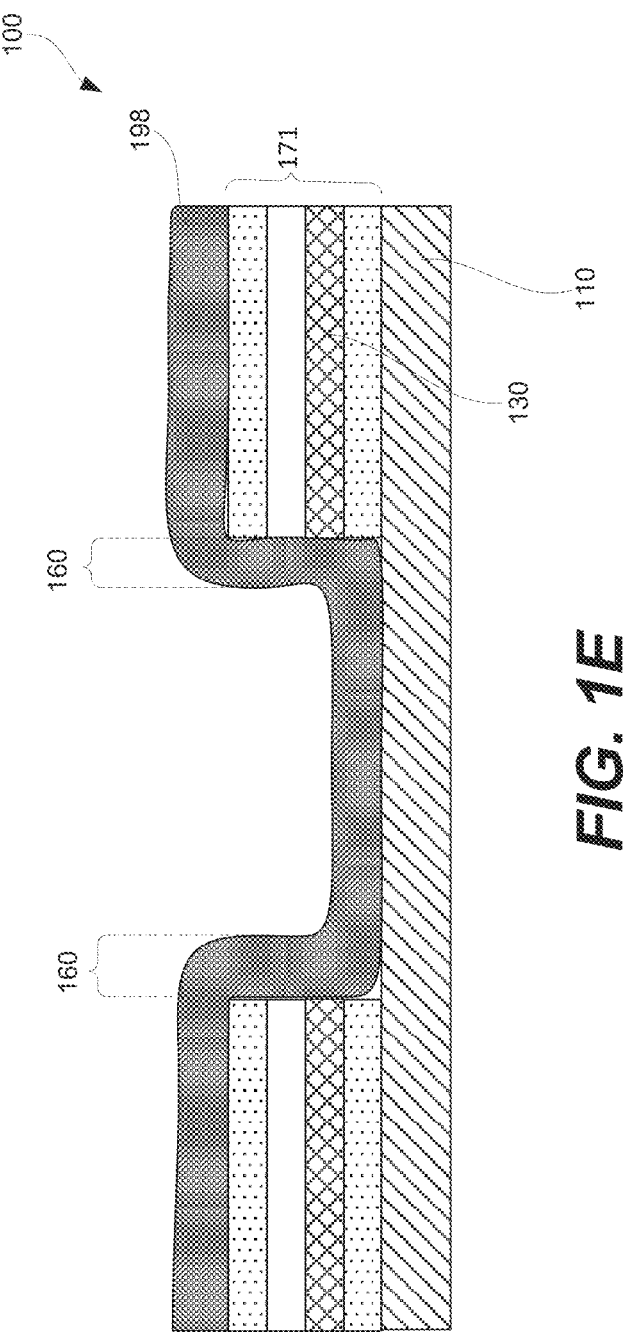
FIG. 1E is a schematic cross-sectional view of another example of the energy-efficient signal-transparent window assembly comprising a protective layer.

FIG. 1E illustrates another example of energy-efficient signal-transparent window assembly 100, which comprises protective layer 198. In this example, protective layer 198 conforms to the entire surface of energy-efficient signal-transparent window assembly 100. Specifically, protective layer 198 extends over substrate-interfacing stack 171 and over the portion of window substrate 110 that is free from substrate-interfacing stack 171, but also possible covered over stack 172 with or without non-conductive spacers 180. Furthermore, protective layer 198 forms adjacent sidewalls 160. The thickness of protective layer 198 may be from 10 nanometers to 10+ microns and even higher.

In some examples, energy-efficient signal-transparent window assembly 100 is placed into an insulated glass unit (IGU) window, which features multiple panes of glass, separated by an inert gas or vacuum, widely used in buildings.

Figure 2A:
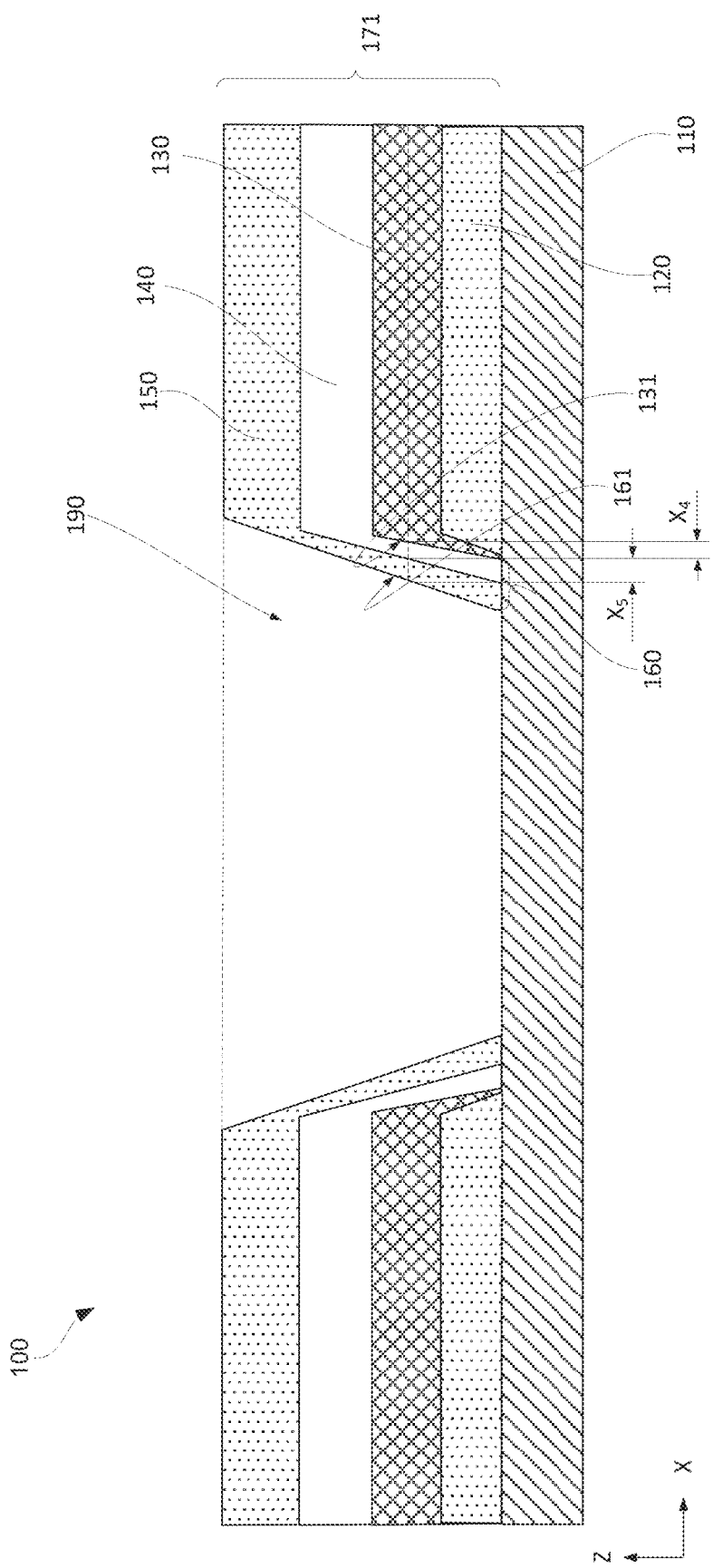
FIG. 2A is a schematic cross-sectional view of an energy-efficient signal-transparent window assembly with substrate-interface low-E stacks and no spacers, in accordance with some examples.

FIG. 2A is another example of energy-efficient signal-transparent window assembly 100. Similar to the examples described above, in this example, energy-efficient signal-transparent window assembly 100 also comprises window substrate 110, first dielectric layer 120, conductive layer 130, barrier layer 140, and second dielectric layer 150. However, this example does not include any non-conductive spacers. These spacers, if initially present, were removed, e.g., during heat treating/tampering of energy-efficient signal-transparent window assembly 100. In other words, the example shown in FIG. 1A can be converted into the example shown in FIG. 2A.

Referring to FIG. 2A, first dielectric layer 120 is disposed over window substrate 110. In more specific examples, first dielectric layer 120 is disposed entirely on window substrate 110. In other words, no portion of first dielectric layer 120 is disposed away from window substrate 110. Conductive layer 130 is disposed over first dielectric layer 120 such that first dielectric layer 120 is disposed between conductive layer 130 and window substrate 110. Conductive layer 130 is formed by multiple disjoined structures 132 defined by openings 190, forming pattern 185. Various examples of pattern 185 are described below with reference to FIGS. 4A and 4B. Each of openings 190 is disposed between two adjacent sidewalls 160. Furthermore, barrier layer 140 is disposed over conductive layer 130 such that conductive layer 130 is disposed between first dielectric layer 120 and barrier layer 140. Finally, second dielectric layer 150 is disposed over barrier layer 140 such that barrier layer 140 is positioned between second dielectric layer 150 and conductive layer 130. Overall, first dielectric layer 120, conductive layer 130, barrier layer 140, and second dielectric layer 150 form substrate-interfacing stack 171 at least over a portion of window substrate 110.

Unlike examples described above with reference to FIGS. 1A-1D, energy-efficient signal-transparent window assembly 100 in FIG. 2A does not include or is free from non-conductive spacers. In the example of FIG. 2A, the separation between multiple disjoined structures 132 is achieved by openings 190, which remain unfilled. It should be noted that energy-efficient signal-transparent window assembly 100 in FIG. 2A may be formed from any examples described above with reference to FIGS. 1A-1D by removing non-conductive spacers from openings 190.

Referring to FIG. 2A, in some examples, each of two adjacent sidewalls 160 extends to window substrate 110 and is formed by at least one of barrier layer 140 and second dielectric layer 150. In more specific examples, each of two adjacent sidewalls 160 is formed by both barrier layer 140 and second dielectric layer 150. Sidewalls 160 are used to protect conductive layer 130 from the environment. More specifically, sidewalls 160 extend over the edge of conductive layer 130, which faces openings 190, and blocks any access to conductive layer 130. As such, conductive layer 130 is protected from oxidation and other negative effects on the environment. For purposes of this disclosure, the term "sidewall" is referred to a portion of substrate-interfacing stacks 171 (or a portion of spacer-interfacing stacks 172), extending over edge 131 of conductive layer 130.

More specifically, each of two adjacent sidewalls 160 has sidewall surface 161, facing another of two adjacent sidewalls 160. These sidewall surfaces 161 define, in part, opening 190. In some examples, sidewall surface 161 is separated from conductive layer 130 by at least 2 nanometers or even at least 3 nanometers. This separation may be referred to as a thickness of sidewalls 160 and, in some examples, represents a combined thickness of barrier layer 140 and second dielectric layer 150. FIG. 2A illustrates the thickness of barrier layer 140 as $X_4$ is at least about 1 nm, or even at least 0.3 nm and the thickness of second dielectric layer 150 as $X_5$ is at least about 10 nm, or even at least about 2 nm.

Figure 2B:
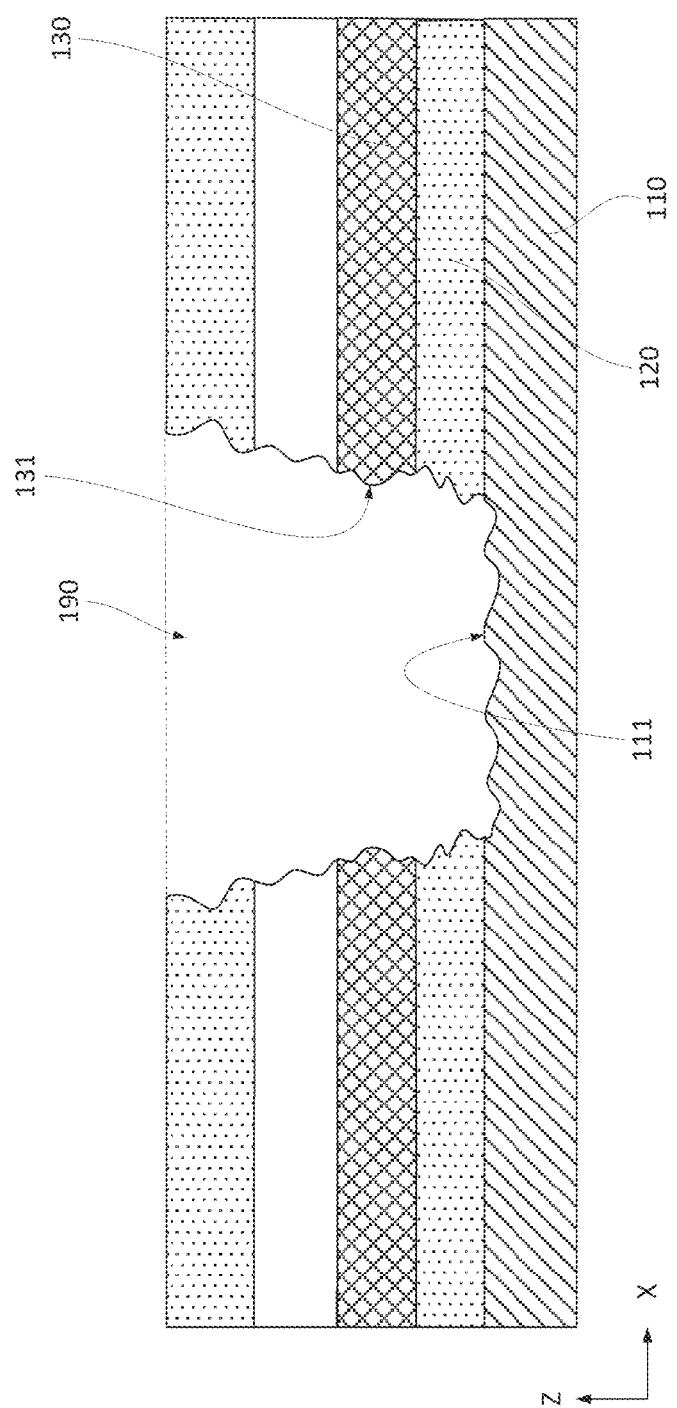
FIG. 2B is a schematic cross-sectional view of an energy-efficient signal-transparent window assembly formed using conventional methods, such as laser scribing.

Referring to FIG. 2A, in some examples, a portion of window substrate 110 between two adjacent sidewalls 160 is exposed. This portion may be referred to as an exposed portion. In more specific examples, the exposed portion of window substrate 110, which extends between two adjacent sidewalls 160, is planar and substantially intact. This feature distinguishes energy-efficient signal-transparent window assembly 100 in FIG. 2A from conventional low-E windows, one example of which is shown in FIG. 2B. Specifically, FIG. 2B illustrates exposed portion 111 of window substrate 110 being non-planar and having a high surface roughness. This non-planar type of exposed portion 111 is formed, e.g., by laser scribing, which removes a portion of window substrate 110 when forming opening 190. Furthermore, FIG. 2B illustrates conductive layer 130 having exposed edge 131, which could be oxidized or otherwise affected by the environment.

Figure 3:
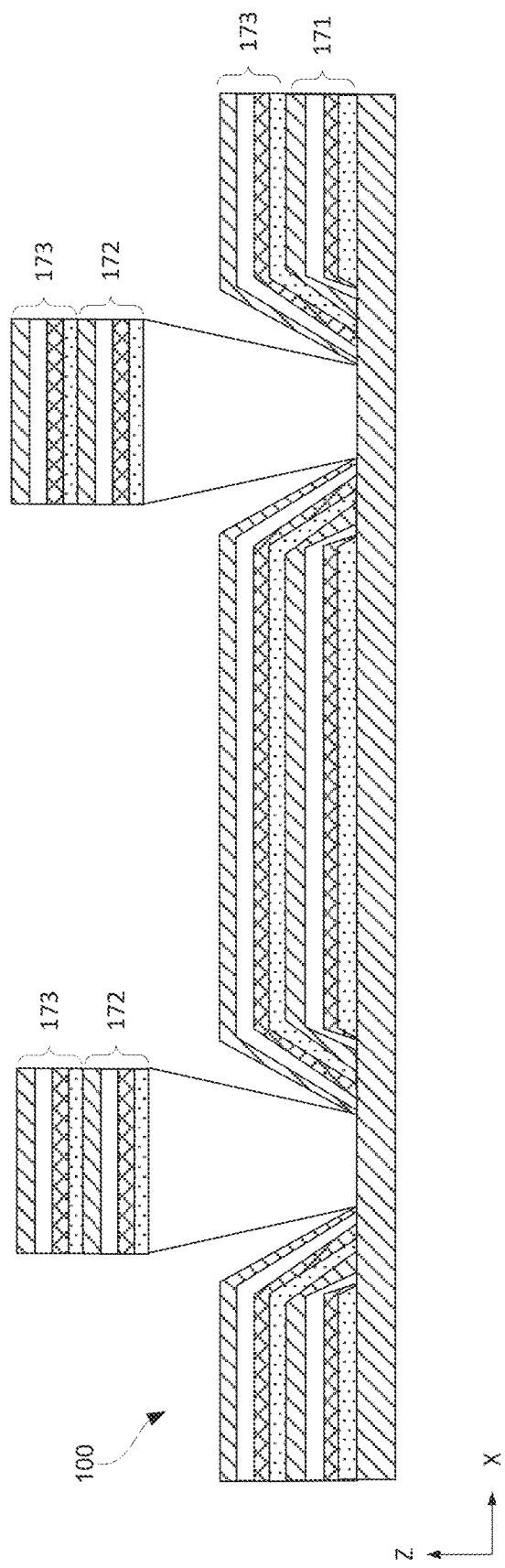
FIG. 3 is a schematic cross-sectional view of an energy-efficient signal-transparent window assembly with multiple low-E stacks formed on top of each other, in accordance with some examples.

Referring to FIG. 3, in some examples, energy-efficient signal-transparent window assembly 100 comprises multiple low-E stacks, formed on top of each other. Each low-E stack comprises first dielectric layer 120, conductive layer 130, barrier layer 140, and second dielectric layer 150. Two examples of such low-E stacks are substrate-interfacing stacks 171 and spacer-interfacing stacks 172, both of which are described above. FIG. 3 also illustrates additional stacks 173, positioned over substrate-interfacing stacks 171 and spacer-interfacing stacks 172. Similar to substrate-interfacing stacks 171 and spacer-interfacing stacks 172, each of additional stacks 173 comprises first dielectric layer 120, conductive layer 130, barrier layer 140, and second dielectric layer 150. While FIG. 3 illustrates only one additional stack 173 over each one of substrate-interfacing stacks 171 and spacer-interfacing stacks 172, one having ordinary skill in the art would understand that any number of stacks are within the scope.

Figure 4A:
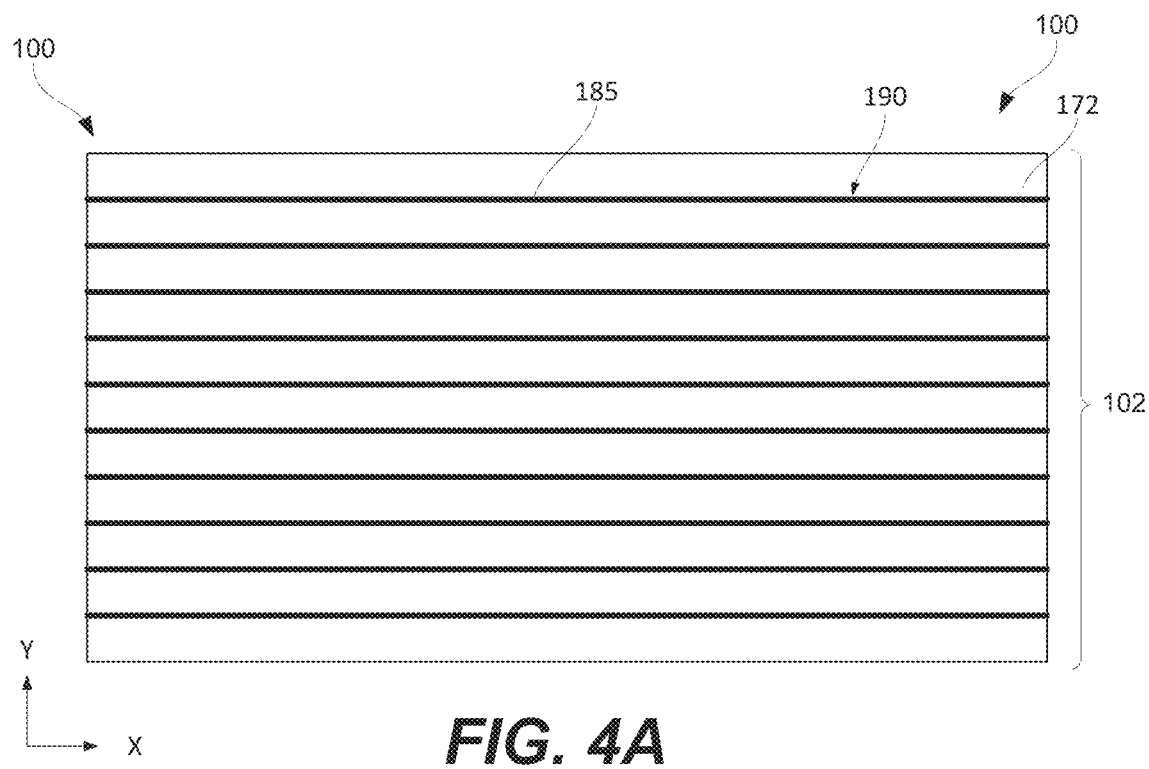
FIG. 4A is a schematic top view of an energy-efficient signal-transparent window assembly, showing one pattern example.
Figure 4B:
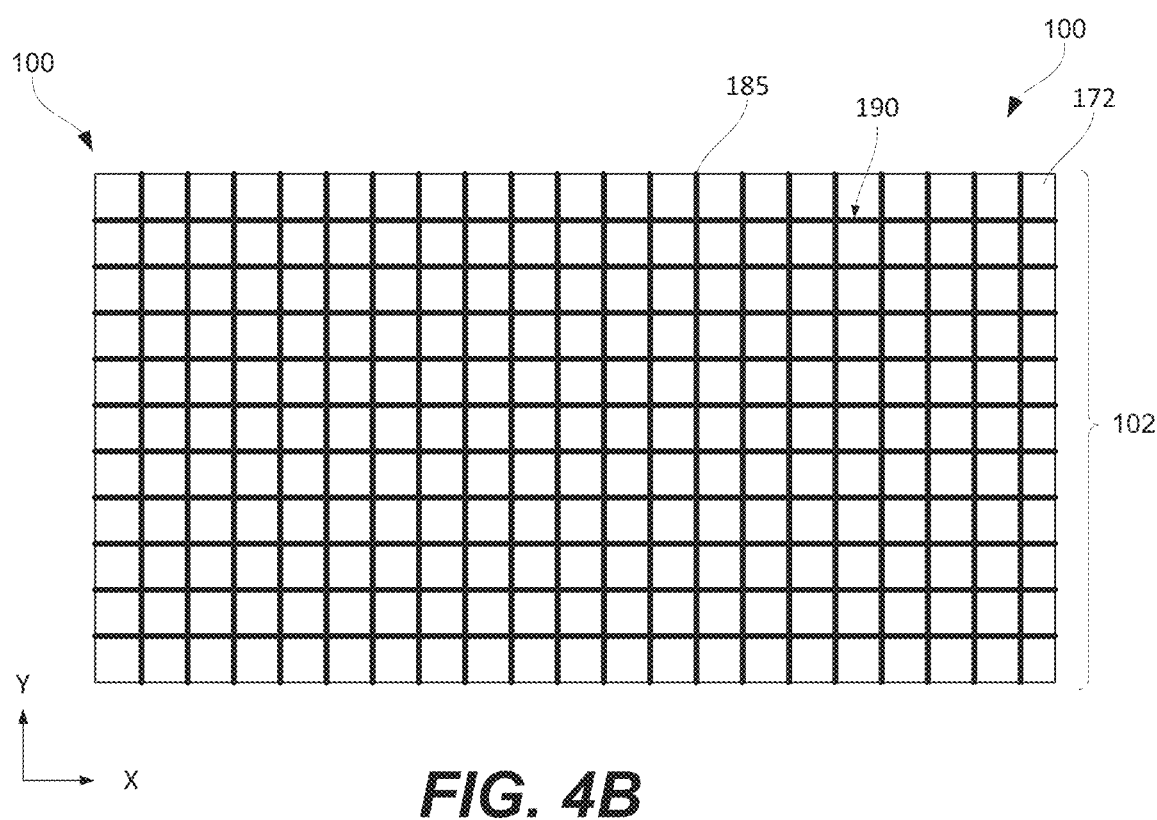
FIG. 4B is a schematic top view of an energy-efficient signal-transparent window assembly, showing another pattern example.

FIGS. 4A and 4B illustrate top schematic views of two examples of patterns 185, formed by openings 190. As described above with reference to FIG. 1A, openings 190 may have non-conductive spacers, positioned within openings and each non-conductive spacer supporting spacer-interfacing stacks. Alternatively, openings 190 may be empty, as described above with reference to FIG. 4B. Openings are surrounded by substrate-interfacing stacks 171.

Various types of patterns are within the scope. Specifically, FIG. 4A illustrates a liner pattern, formed by parallel openings 190. FIG. 4B illustrates rectangular patterns, formed by two sets of parallel openings 190, crossed each other, extending at a 90° angle relative to each other, or other angles. This portion of energy-efficient signal-transparent window assembly 100 may be referred to as patterned low-E coating 102.

Figure 4C:
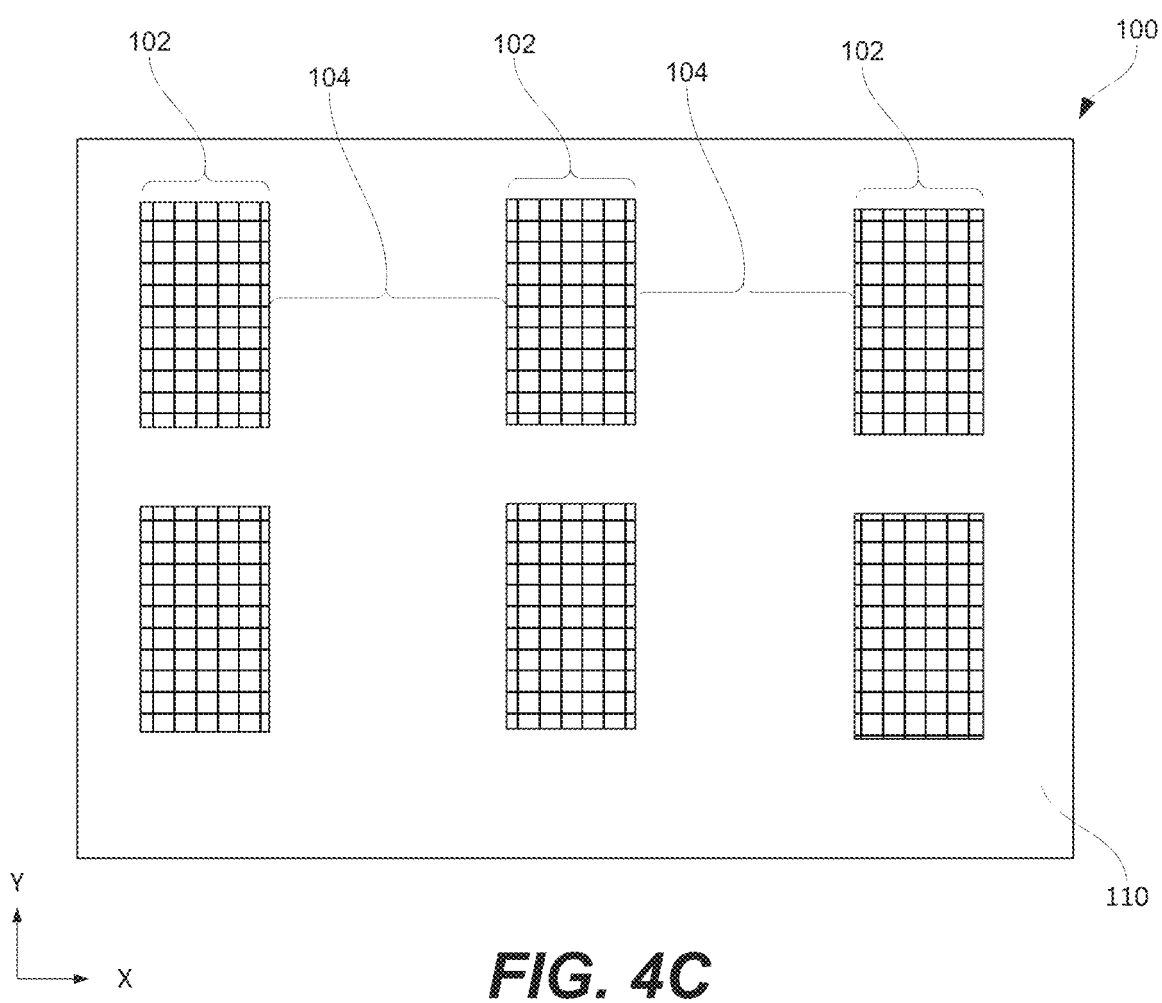
FIG. 4C is a schematic top view of an energy-efficient signal-transparent window assembly, showing patterned portions and non-patterned portions.

It should be noted that energy-efficient signal-transparent window assembly 100 does not need to be covered by patterned low-E coating 102 and some areas of energy-efficient signal-transparent window assembly 100 may have un-patterned low-E coating 104 as, e.g., is schematically shown in FIG. 4C. In this example, energy-efficient signal-transparent window assembly 100 is still able to transmit signal-carrying electromagnetic waves through patterned low-E coating 102, while un-patterned low-E coating 104 may block these electromagnetic waves.

Processing Examples

Figure 5:
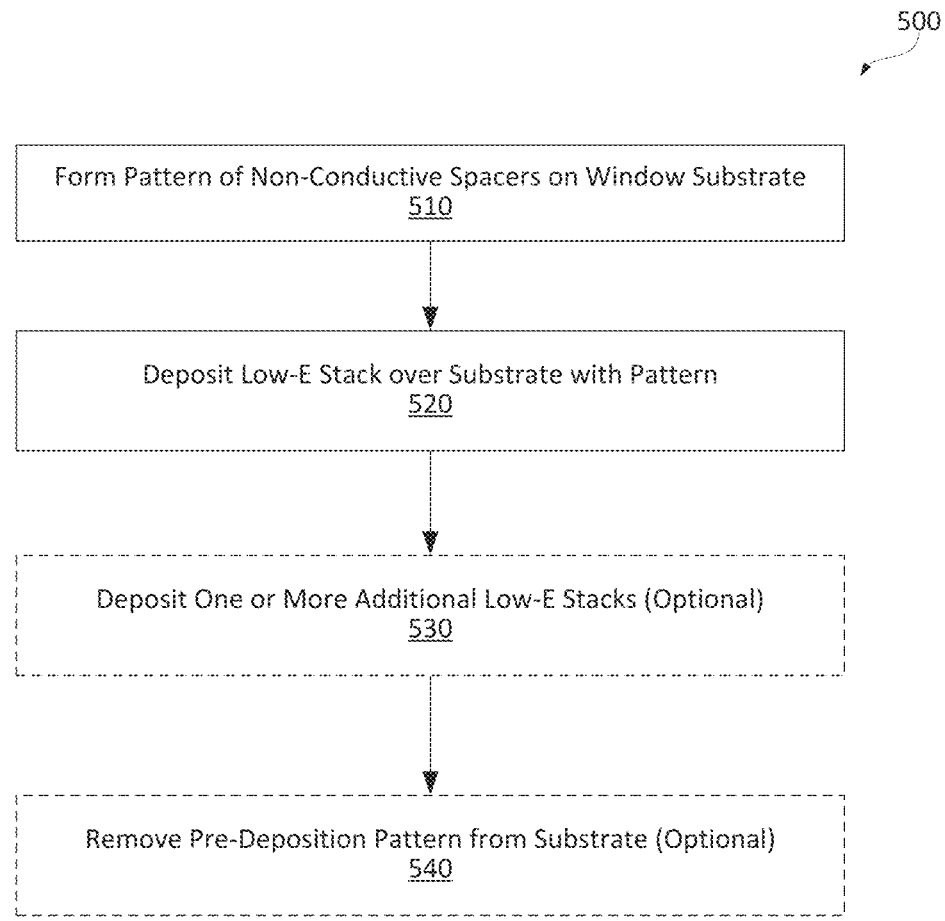
FIG. 5 is a process flowchart of a method for forming an energy-efficient signal-transparent window assembly, in accordance with some examples.

FIG. 5 is a process flowchart corresponding to method 500 of forming an energy-efficient signal-transparent window assembly 100, in accordance with some examples.

Figure 6A:
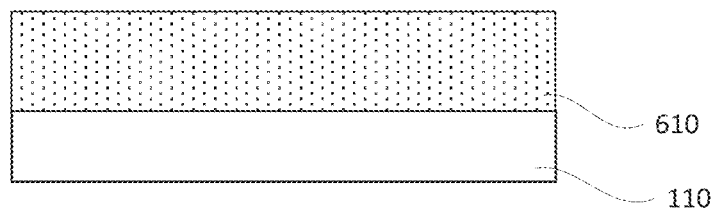
FIGS. 6A-6D are schematic cross-sectional views of various stages of the method while forming an energy-efficient signal-transparent window assembly, in accordance with some examples.
Figure 6B:
Figure 6B:
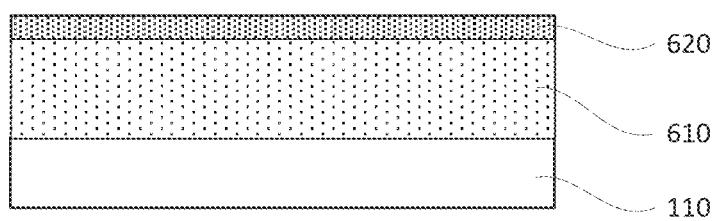
Figure 6C:
Figure 6C:
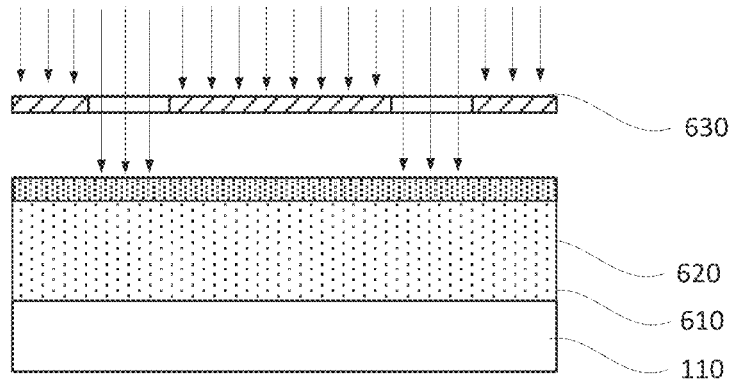
Figure 6D:
Figure 6D:
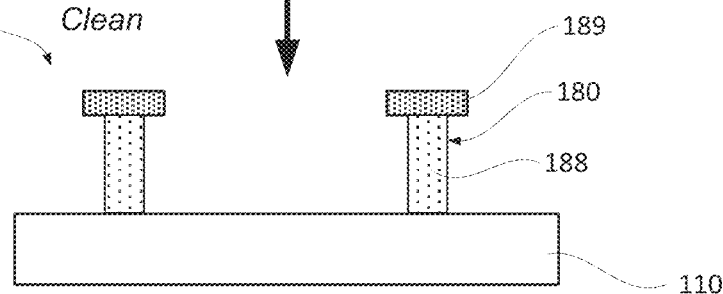

Method 500 may commence with forming (block 510) pattern 185 of non-conductive spacers 180 on window substrate 110. For example, pattern 185 of non-conductive spacers 180 may be formed using photolithography as, e.g., is schematically shown in FIGS. 6A-6D. Specifically, FIG. 6A illustrates a processing stage during which under-layer 610 is formed as a continuous coating on window substrate 110. FIG. 6B illustrates a processing stage during which photoresist layer 620 is formed over under-layer 610. Photoresist layer 620 is also formed as a continuous coating. Photoresist layer 620 may be formed from positive or negative photoresist, which corresponds to whether the exposed portion of photoresist layer 620 is soluble or insoluble to a photoresist developer. It should be noted that under-layer 610 is an optional layer. In some examples, photoresist layer 620 is formed directly on window substrate 110. FIG. 6C illustrates a processing stage during which photoresist layer 620 is exposed, e.g., using photolithographic mask 630. Finally, FIG. 6D illustrates a processing stage after etching and cleaning photoresist layer 620 and, if present, under-layer 610. Specifically, photoresist layer 620 is converted into spacer head 189, while under-layer 610 is converted into spacer base 188. The materials of photoresist layer 620 and under-layer 610 may be selected such that the etching rate of under-layer 610 is faster than that of photoresist layer 620. As a result, spacer base 188 has a smaller width than spacer head 189. Collectively, spacer head 189 and spacer base 188 form non-conductive spacers 180. While FIGS. 6A-6D illustrate an example in which two layers are used to form non-conductive spacers 180, one having ordinary skill in the art would understand that a single layer or more than two layers may be used.

In some examples, the complexity and cost of large size lithography equipment can be reduced by using a plurality of smaller sized modules (e.g., half size of the maximum substrate width in the production or smaller). The lithography pattern from different modules can be overlapped, and the light intensity non-uniformity crossing the whole lithography pattern area can be more than 20% calculated using the formula:

(MAX value−MIN value)/(2×AVERAGE value).

It should be noted that there is a tradeoff between the equipment complexity/cost and the uniformity of the light intensity in the lithography equipment. Described are novel methods of using multiple module exposures, with a tolerance of >20% of non-uniformity of light intensity, which can significantly reduce the lithography equipment cost.

Integrating multiple modules in a lithography process may involve portions of energy-efficient signal-transparent window assembly 100 in which portions of low-E coating stack are not patterned. FIG. 4C, described above, illustrates patterned portions 102 positioned within non-patterned portions 104. The size and relative areas of these portions are selected based on the signal transmission requirements. In some examples, the average width of non-patterned portions 104 is smaller than 50 centimeters or, more specifically, smaller than 10 centimeters. In some examples, patterned portions 102 represent 20% or 50% of the substrate total area with only 7 DB or 3 DB additional losses on the signal transmission. The lithography pattern area larger than 90% substrate area only introduces less than 1 DB additional loss on the cellphone transmission in comparing that of the whole substrate patterned. In this example with some areas without patterns, the positive photoresist is used for the lithography. More specifically, areas without lithography patterned are cleaned out after the PR post-development process, to leave clean glass surfaces for the rest of the glass coating processes.

Figure 6E:
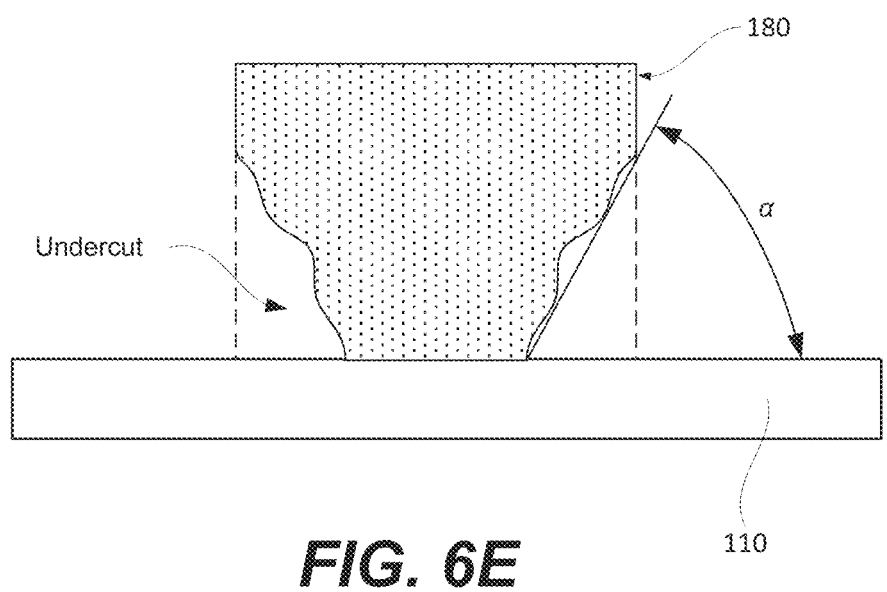
FIG. 6E is a schematic cross-sectional view of a non-conductive spacer, showing an undercut, in accordance with some examples.

Furthermore, in some examples, non-conductive spacers 180 have a tapered structure, defined by an undercut. One such example is schematically shown in FIG. 6E. As described above, the undercut helps with forming the separation between multiple disjoined structures 132 as further described below.

Figure 7A:
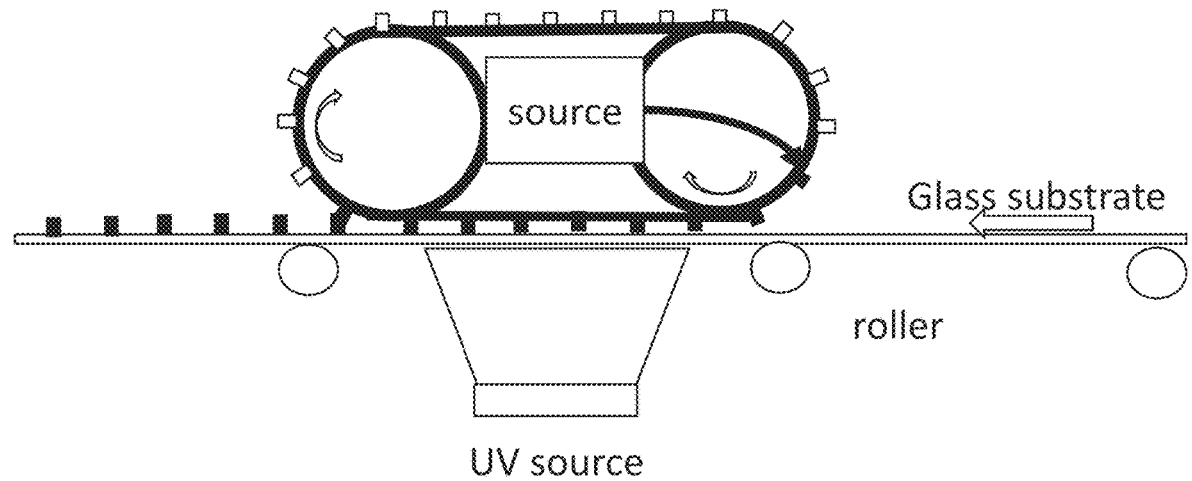
FIGS. 7A-7D are schematic views of other methods of forming non-conductive spacers of an energy-efficient signal-transparent window assembly, in accordance with some examples.
Figure 7B:
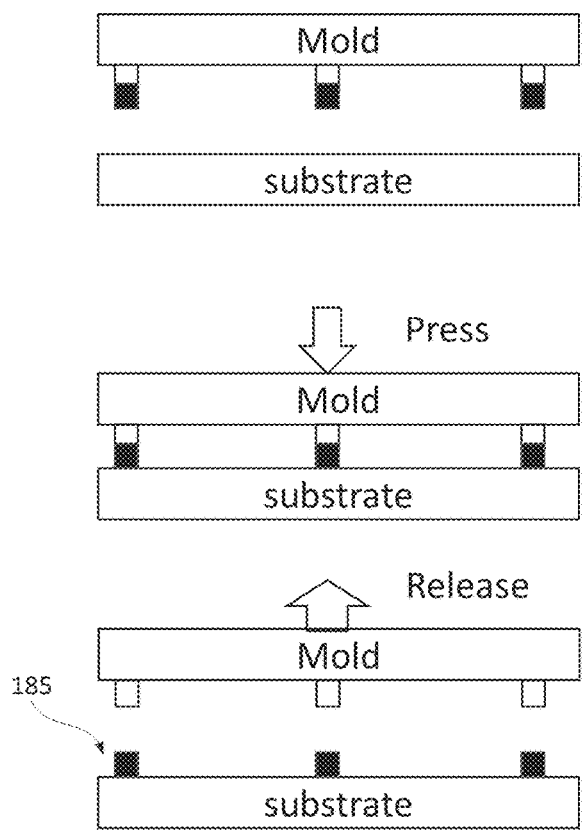
Figure 7C:
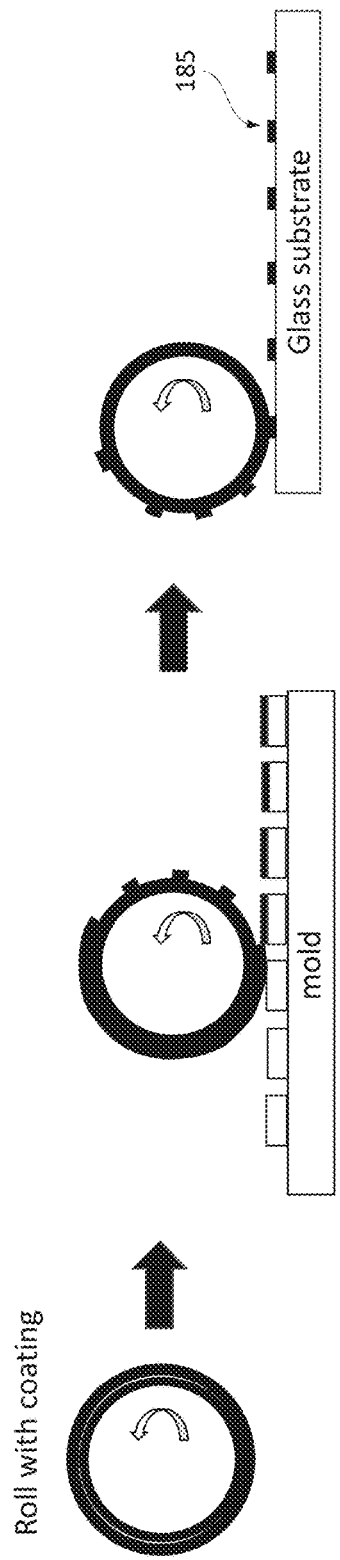
Figure 7D:
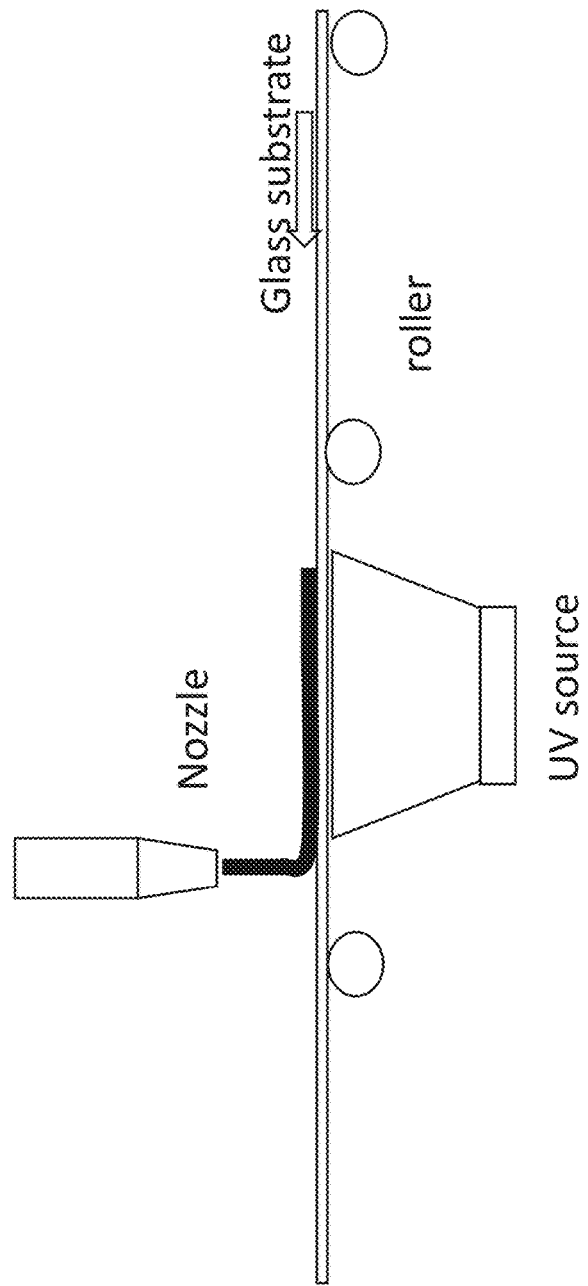
Figure 8A:
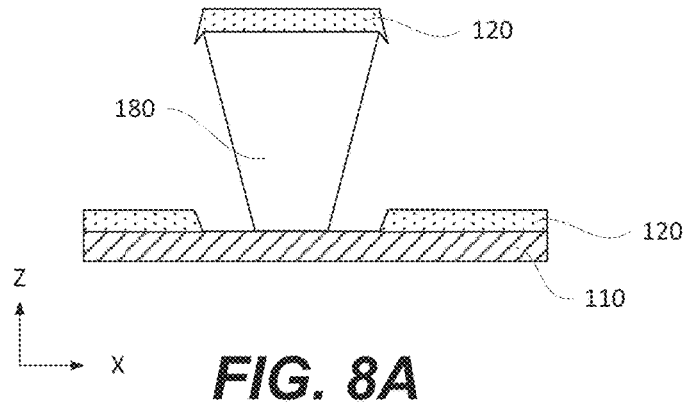
FIGS. 8A-8D are schematic cross-sectional views of various stages of the method while forming a low-E stack over a non-conductive spacer and window substrate, in accordance with some examples.
Figure 8B:
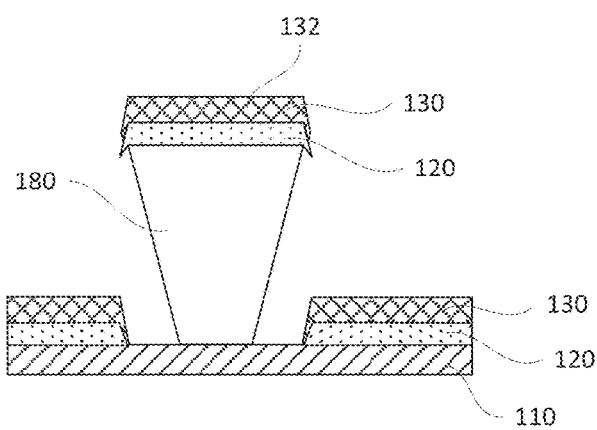
Figure 8C:
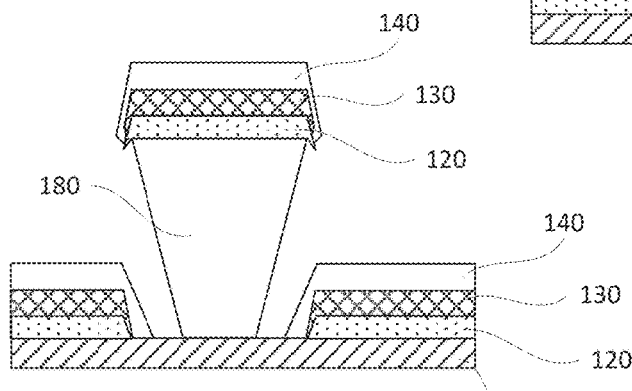
Figure 8D:
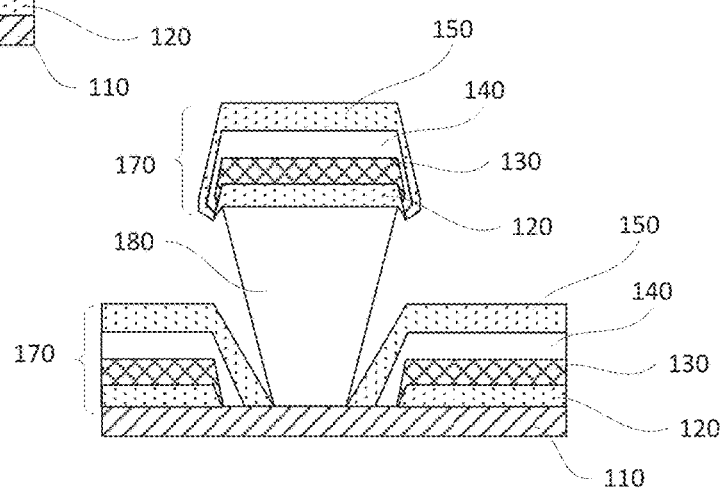

FIGS. 7A-7D illustrate other examples of forming pattern 185 of non-conductive spacers 180. In some examples, non-conductive spacers 180 are formed using nanoimprint lithography (NIL). In comparison to photolithography, the NIL offers the benefits of low cost and high throughput. For example, as shown in FIG. 7A, an imprint mask with physical protrusions is mechanically pressed against a pre-coated patterning layer to mechanically deform it. Patterning material in this area with mechanical deformation is effectively removed. Alternatively, as shown in FIG. 8B, patterning materials are formed by imprint molding. Patterning material is transferred to substrate in the area with physical contact between molding and substrate.

Subsequent processing steps after NIL pattern generation are substantially the same or similar to processing steps used with photolithography. To reduce equipment cost with NIL, multiple NIL modules of smaller size (e.g., half size of substrate width or less) are combined to cover low-E glass width. This is similar to the aforementioned multiple photolithography module approaches.

Overall, pattern 185 of non-conductive spacers 180 may be formed using materials extrusion, nozzle jetting, or indirectly deformation mechanically, such as using a mold, stamp, or by laser, UV source or electron beam curing or other heating source hardening, or combining those techniques.

In some examples, pattern 185 of non-conductive spacers 180 is formed by attaching fibers, wires, or other like structures to window substrate 110. In some examples, a non-conductive material (e.g., plastics, glass, transparent polymers, transparent resins, photoresist) is coated and patterned directly (e.g., using materials extrusion, nozzle jetting), indirectly (e.g., using a mold, a stamp, or by laser, UV source or electron beam curing or other heating source hardening), or a combination of these techniques.

Returning to FIG. 5, method 500 proceeds with depositing (block 520) stack 170 over window substrate 110 and non-conductive spacers 180. As described above, stack 170 comprises first dielectric layer 120, conductive layer 130, barrier layer 140, and second dielectric layer 150. Each layer is formed in a separate operation using, e.g., physical vapor deposition (PVD). FIGS. 8A-8D illustrate different stages during this stack forming operation. As shown in FIG. 8B, conductive layer 130 comprises multiple disjoined structures 132 defined by pattern 185 of non-conductive spacers 180. Disjoined structures 132 are formed due to non-conductive spacers 180 protruding over the substrate.

In some examples, depositing stack 170 also comprises forming two adjacent sidewalls 160 around each of non-conductive spacers 180 such that each of two adjacent sidewalls 160 around extends to window substrate 110 and is formed by at least one of barrier layer 140 and second dielectric layer 150, which may be referred to as deposition extensions. Various ways of controlling the deposition extension (of each layer forming a stack in) the undercut area of the photoresist (PR) are within the scope. For example, increasing the pressure in a sputtering deposition chamber makes deposition more isotropic or, in other words, less directional. Thus, there is more encroachment of sputtered materials in the PR undercut region. For example, when the pressure is lower during deposition of conductive layer 130 than that during the deposition of barrier layer 140 and also than that during the deposition of second dielectric layer 150, the edge sidewall of conductive layer 130 is covered by barrier layer 140 and second dielectric layer 150. The higher the pressure difference, the thicker sidewall protection is provided by each of barrier layer 140 and second dielectric layer 150. For example, a low-pressure processing condition (such as 0.5~2 milliTorr) is for deposition of conductive layer 130. At a such low-pressure level, a very limited amount of material will reach the undercut region. On the other hand, a high-pressure condition (such as 3-300 milliTorr) is used for deposition of barrier layer 140 and second dielectric layer 150, providing more material into the undercut region. In some examples, additional and/or alternative techniques are used to enhance the directional deposition of conductive layer 130. One example is an ionized sputtering technique with high ionization rate plasma from a special sputter source to enhance the sputtering directional feature. Another example is using a second bias source under the glass to enhance the directional sputter deposition. Additional examples include collimators for sputtering, and/or evaporation method can enhance the direction deposition.

The sidewall protection of conductive layer 130 (with a barrier layer and a second dielectric layer) has demonstrated excellent environmental and thermal durability. The environmental durability was tested by dipping a sample for one hour into a boiling water container. The thermal durability was tested using 650° C. baking for 8 minutes. There were no noticeable defects under the microscope inspection.

These sidewall conductive layer protection designs and methods are applicable to any stacks and any number of layers in each stack. Both highly non-directional processes (e.g., high-pressure processes) and directional processes (e.g., low-pressure processes) are within the scope.

One issue of the undercut profile of single-layer photoresist is influenced by the non-uniformity of the light intensity with lithography equipment. There is a bi-layer method that minimizes this influence, where the bottom layer material having a dissolution rate in the developer much less sensitive on light intensity than that of the photoresist above the bottom materials, so the dissolution rate is more dependent on time and other processing parameters instead of exposing light intensity. Thus, the undercut amount is more dependent on the photoresist materials and less dependent on the light intensity. As such, a large non-uniformity of exposing light intensity has a very small influence on the undercut amount, so that it can be acceptable in this application.

Besides the pattern line sidewall profile, the top surface roughness can be another factor. Further experiments on patterned structure with a rectangular cross-sectional profile were studied to compare the effects of oxygen plasma treatment. Oxygen plasma was generated using a sputtering titanium gun with a pure oxygen flow process in a typical vacuum sputtering system. After oxygen plasma treatment of the patterned structures, the low-E coating stack was deposited on the top of these structures. After heating samples to 200° C. for 8 minutes in atmospheric condition, the conductivity was different between the treated samples and the controlled samples. Specifically, the low-E film from the two sides of the patterned structure was not conducting for the treated samples. However, it remains conductive for the controlled samples (without oxygen plasma treatment). Without being restricted to any particular theory, this difference is attributed to the difference in the surface roughness of the top surface of a patterned structure. Specifically, controlled samples (without oxygen plasma treatment) top surface remained smooth (e.g., based on inspection). The surface roughness (Ra) was estimated to be 10 nm or below. However, treated samples (with oxygen plasma treatment) have demonstrated the formation of metal oxides on the top surface, which caused a significant increase in surface roughness to about Ra 0.1 micrometers to 10 micrometers. In this example, Ra is an arithmetic average value of absolute values of the profile height deviations from the mean line within the evaluation length, such as 100 micrometers. The rough surface causes potential defects in low-E films (especially silver) at high temperatures resulting in conductivity losses. However, a smooth surface allows deposition and subsequent thermal treatments of low-E films without similar defects such that the low-E films remain as good electrically conductive. Thus, the surface roughness of the top surface of patterned structures is another important factor impacting cellular signal transmission.

In some examples, the height/thickness of the pattern line is between 20 nm and 3000 nm, and some is between 20 nm and 1000 nm. The desired roughness upon oxygen treatment was achieved on a patterned photoresist with a sputtering gun in a vacuum chamber. The top surface roughness was estimated at approximately 10 nm-300 nm. Such roughness was likely due to forming "peaks" and "valleys" from the area with and without metal oxide residues respectively. Specifically, metal oxide residues can be a micro-mask blocking the oxygen ashing, which results in peaks on the top surfaces. On the other hand, the area without those "residue mask" protection, become "valleys" and were "ashed out" during the treatment. Low-E stacks were then deposited on these thin patterns. After heating to 200° C. for 8 minutes at atmospheric conditions, the low-E film from the two sides of the pattern lines was no longer conductive. It should be noted that in this experiment, the pattern lines were very thin (e.g., 20 nm~1000 nm) and have a high surface roughness of the top surfaces (Ra is estimated at 10 nm~300 nm). The low-E coating deposited above these pattern lines becomes non-conductive between the two sides of the pattern line. It is expected that thin structures (e.g., less than 1000 nm in thickness) with rough top surfaces will show the same performance.

It should be noted that thin thicknesses (e.g., less than 3000 nm) of pattern lines not only help with materials cost savings but also help with enhancing abrasion resistance, e.g., to avoid uneven coating surfaces between pattern lines and surrounding coatings.

Various methods of forming thin patterned lines (e.g., less than about 3000 nm) with rough top surfaces (e.g, Ra of above 10 nm) are within the scope. One example is an oxygen plasma treatment, which forms a rough metal oxide layer on the top surface of the patterned lines. Another example involves using one or more special organic materials, doped with 0.01% to 20% of one or more other metal elements or semi-conductor elements, followed by ashing through an oxygen plasma process. Some examples of these metal/semiconductor elements include semi-conductor elements B, Si, Ge, and the main group I & II: Na, K, Rb, Mg, Ca Sr, Ba, main group III, IV, V: Al, Ga, In, Sn, Tl, Pb, Bi, and transition metals Ti, V, Cr, Mn, Fe Co, Ni, Cu, Zn, Y, Zr, Nb, Mo, Tc, Hf, Ta, W, Re, Ce, Dy, Eu, Gd, La, Nd, Pr, Sm, Sc, Tb. The benefit of the organic materials with those dopants can generate particles as a seed mask during the oxygen ashing process, to form the "valleys" and "peaks" on the film, so that the rough pattern can be generated.

In some examples, pattern lines are directly printed with rough materials by printing the solution and evaporating solvent with solutes remaining as patterned rough materials. Typical solvents are water, acetone, alcohol, etc.; the solute could be inorganic or organic materials, such as salts or base inorganic materials, of NaCl, $Na_2CO_3$, $Na_2SO_4$, $Ca(OH)_2$, NaOH, etc., or organic materials, such as polymer powders.

Various examples of increasing the surface roughness of the top surfaces of patterned structures are within the scope. Some of these examples include, but are not limited to, directly coating/printing materials with high roughness or the materials being rough after special treatments. Furthermore, baking time, oxygen treatment, photoresist developing conditions, photoresist organic materials may be specifically selected to achieve the desired surface roughness.

Besides the sidewall profile and top surface roughness, the volume of pattern line shrink after the high-temperature treatment can be another factor for cell phone transmission. Patterned structures with rectangular cross-sections were tested using high-temperature treatment in air, such as 650° C. for 8 minutes, which may be referred to as heat treatment. After the heat treatment, the patterned structures were burned out if exposed to air, even when the pattern materials were covered with low-E coating, the organic materials can partially be reactivated, and the pattern volume was shrunk dramatically before and after heat treatment, more than 20% volume changed. The low-E film, located on the top of the patterned structure, became a very rough coating (e.g., the surface roughness Ra of greater than 10 nm), and the low-E coating was not conductive between the two sides of the patterned structures. In this case, the initial photoresist is used to define the line pattern that makes the low-E coating film rough (such as Ra>10 nm). This enables a high roughness of the coating portion to make the low-E coating on both sides of the line non-conductive. Specifically, the silver layer (of the low-E coating) composition increases the amount of oxygen (O) elements, for example, more than 2% atomic, in comparison to their corresponding silver layer at the neighbor coating on the substrate. Thus, for the large size (more than a square meter) coating with those pattern lines, the cell phone signal can penetrate those coating, after a glass temper process of high-temperature treatment at atmospheric conditions. Overall, the high-temperature treatment changes the volume of photoresist patterns to make low-E stack coatings (disposed on the top of these patterns) become non-conductive from two sides of the photoresist line. As a result, low-E coatings become more transmissive to cell phone signals.

In some examples, method 500 comprises depositing (block 530) one or more additional stacks over stack 170, which is disposed over window substrate 110 and non-conductive spacers 180

In some examples, method 500 comprises removing (block 540) non-conductive spacers 180 from energy-efficient signal-transparent window assembly 100. For example, energy-efficient signal-transparent window assembly 100 may be tempered (e.g., subjected to high temperatures) turning non-conductive spacers 180 into volatile species, which are removed from the environment.

Experimental Results

Various tests have been conducted to characterize the energy-efficient signal-transparent window assemblies, described above. The first test was performed using Sample 1, which used a 2.2-millimeters thick glass as a window substrate. A first dielectric layer, deposited over this window substrate, was formed from ZnSnO. A conductive layer was formed from silver-titanium alloy, while a barrier layer was formed from titanium. Finally, a second dielectric layer was also formed using ZnSnO. The overall coating size of this sample was 100 millimeters×60 millimeters. The sample demonstrated a good sheet resistance of 7 Ohm/square, which is equivalent to the emissivity of 0.08. Sample 1 did not include any patterning of the conductive layer or any other layers and was used as a baseline reference.

IR blocking characteristics were tested using an IR lamp and a light-mill radiometer. Specifically, the radiometer vanes spin only when IR radiation is present. Sample 1, described above, showed exceptional IR blocking characteristics. When Sample 1 was inserted between the IR lamp and the radiometer, the vanes of the radiometer stopped spinning completely, which demonstrates effective IR blocking.

Electromagnetic wave transmission characteristics were tested using a non-metallic box, wrapped in aluminum foil and an opening of 95 millimeters by 55 millimeters. The box simulates a building that electromagnetic waves cannot penetrate. Only the window in the box allows electromagnetic wave penetration. Sample 1 was installed into the opening for testing. The signal source, used in this experiment, was a 2.4 GHz router (using wavelengths of 125 millimeters). A phone, APPLE® IPHONE® 7, was used as a signal receiver. The phone was equipped with a "Wi-Fi-meter" software application to measure the Wi-Fi signal intensity, received by phone. A reference test was performed with an uncoated glass in the opening and demonstrated the signal strength of −36 dBm to −42 dBm. This signal strength represented a reference baseline for the Wi-Fi signal in the whole test system, including the Wi-Fi source, receiver iPhone, and the house simulator (the box wrapped by aluminum foils). When Sample 1 was placed into the opening, the signal strength dropped from −67 dBm to −72 dBm. As such, two different glass samples have shown about 30 dBm difference or around 1000 time signal intensity reduction due to the low-E coating on the glass.

Sample 2 was prepared by depositing a first dielectric layer (also formed from ZnSnO) on the glass substrate. A thin wire with a grid pattern (80-micron diameter glass fiber) was placed over the first dielectric layer to block portions of the first dielectric layer. After adding the wire, the assembly was reloaded into the vacuum chamber to deposit a first dielectric layer (also of ZnsnO), a conductive layer (of Silver Titanium alloy), a barrier layer (of titanium), and a second dielectric layer (also of ZnSnO). The wire pattern was removed from the assembly and portions of later-deposited layers, extending over the wire pattern, was also removed. As such, a stack of the first dielectric layer, the conductive layer, the barrier layer, and the second dielectric layer becomes discontinuous. This wire removal forms gaps between discontinuous stack pieces. Another dielectric layer was then deposited over these discontinuous stack pieces.

Figure 9:
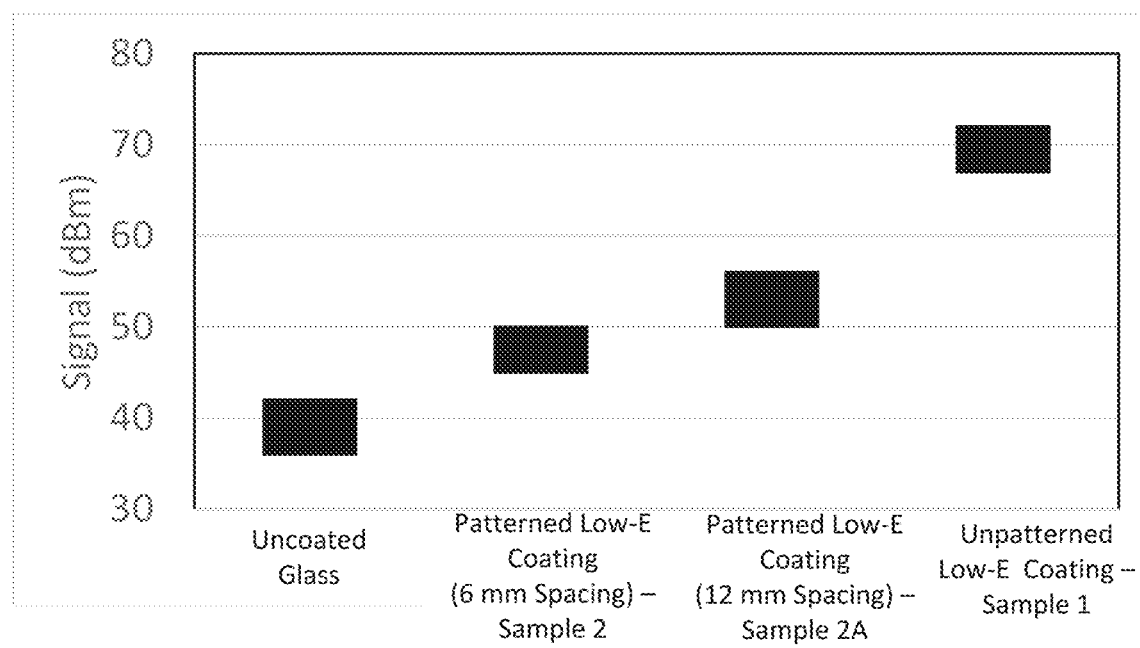
FIG. 9 illustrates the results of the Wi-Fi signal penetration test.

Sample 2 was inspected for various characteristics, in comparison to Sample 1, which was a baseline sample without any patterning. The color of Sample 2 was similar to that of Sample 1 (e.g., not distinguishable for human eyes). The color similarity was attributed to the same structure of Sample 1 and Sample 2, i.e., the same composition, order, and thickness of layers, except with a 2% of area difference at the boundary of discontinuous layers. However, Sample 2 had detectable line marks at 90-degree using an unassisted human eye inspection angle and also using a digital image. Both Sample 1 and Sample 2 had the same sheet resistance of 7 ohm/square, measured by a four-point probe, indicating the same emissivity. The IR blocking properties of Sample 2 were the same as that of Sample 1. Specifically, when Sample 2 was inserted between the IR lamp and the light mill radiometer, the radiometer vanes gradually stopped, indicating the IR blocking. Finally, the results of the "Wi-Fi" penetration test (aluminum foil wrapped box with an opening) are shown in FIG. 9. In comparison to Sample 1 (an un-patterned low-E coating), Sample 2 has shown a much stronger "Wi-Fi" signal reading of about −45 dBm to −50 dBm vs. −67 dBm to −72 dBm for Sample 1. In other words, Sample 2 has shown about 20 dBm improvement over Sample 1 of a low-E coating or around 100-times signal strength improvements. The "Wi-Fi" penetration of Sample 2 is close to the uncoated than to Sample 1.

Another test sample, i.e., Sample 2A was prepared similarly to Sample 2. However, the grid pitch was increased to 12 mm for Sample 2A, in comparison to 6 mm for Sample 2. The test results were very similar for Sample 2 and Sample 2A in terms of color, sheet resistance, IR blocking, and line mark visual ability. However, the "Wi-Fi" (2.4 GHz) penetration was about 5-10 dBm lower for Sample 2A in comparison to Sample 2. As such, a smaller pitch of gaps between the discontinuous stack pieces results in better "Wi-Fi" signal penetration. This trend indicates that the "Wi-Fi" signal penetration can be further improved, if the grid pitch becomes smaller, such as 1 or 2 mm pitch. For high-frequency signals, a small pitch may be used, e.g., 0.5 mm or less for a 5 GHz signal. Pitches of 0.2 mm or less may be used for higher-frequency signals.

Sample 2B was prepared in the same manner as Sample 2A. However, the pattern of Samples 2B was formed by parallel lines (e.g., as shown in FIG. 4A and described above). The pattern of Samples 2A was a square gird (e.g., as shown in FIG. 4B and described above). Testing for the color, sheet resistance, IR blocking, and line mark visibility showed the same results for Sample 2B and Sample 2A. A comparative "Wi-Fi" penetration test for Sample 2B and Sample 2A used three different polarization of radio waves: (1) an omnidirectional antenna "Wi-fi" router operating at 2.4 GHz; (2) a vertically-polarized router antenna; and (3) and a horizontally-polarized antenna. With the omnidirectional antenna, the signal penetration results were similar for both samples (within a 5-dBm error bar). Switching to the vertically-polarized antenna, a similar improvement (of about 20 dBm over the non-patterned conventional low-E coating) was observed in both Sample 2A and Sample 2B. Finally, with the horizontally-polarized antenna, Sample 2B showed a transmission improvement of about 10 DBm over Sample 2A. Overall, parallel-line patterns perform similarly to cross-grid patterns with vertically-polarized and omnidirectional antennas, which are commonly used today in communication networks (e.g., cellular networks). As such, parallel-line patterns can provide an economic solution for improved cellular signal penetration.

Sample 3 was prepared similarly to Sample 2A but used 20-micrometer metal wires in Sample 3 in comparison to 80-micrometer glass fibers in Sample 2A. The overall results were similar between these samples. However, the cross-grid pattern was even less visible in Sample 3 although it was detectable during visual inspection.

Sample 4 used 10-micrometer metal wires but was otherwise the same as Sample 2A and Sample 4. The overall results were similar with further improvement towards lower detectability of grid lines. Overall, Sample 2, Sample 3, and Sample 4 indicate that thinner wires produce less noticeable patterns without compromising electromagnetic wave penetration. As such, wires with a diameter of 20 micrometers or less may be used for adequate visual characteristics.

Sample 5 was the same as Sample 4, but the total thickness of the initial dielectric layers was around 30 nanometers in Sample 5 or half of that in Sample 4. The overall results were similar for Sample 5 and Sample 4 in terms of sheet resistance, IR blocking, and cellular signal penetration. However, the cross-grid pattern in Sample 5 was not detectable under a normal inspection at a 90° angle, which was an improvement over Sample 4. Overall, the dielectric thickness on each side of the conductive layer can be selected to improve the reflective and color transmittance. It should be noted that the line mark visibility was due to the color difference between the bulk portion and the discontinued portion. Sample 6 was prepared using a pattern formed using 80-micrometer glass fibers, attached to a clean glass substrate using a KAPTON® tape.

Thereafter, a vacuum deposition process is the same as for Sample 1 described above. Examining the (1) to (5) steps, the results are very similar to Sample #2A in terms of the color, sheet resistance, IR blocking, but significantly improving the cellular signal penetration, which is significantly different from the low-E Sample #1; however, the line pattern lines are clearly visible.

Sample 7 is similar to Sample 6 but the 80-micrometer glass fiber was replaced with a 10-micrometer metal wire. The performance results of Sample 7 are similar to that of Sample 6, upon the color, sheet resistance, IR blocking, and the cellular signal penetrating. However, the pattern in Sample 7 is still visible, although improved visibility due to the wire size reduced from 80 micrometers to 10 micrometers.

After analyzing the reasons for the pattern visibility issue, it has been found a solution for the pattern visibility for Sample 7. The pattern visibility in Sample 7 is believed to be due to (1) the wire being non-transparent (made from metal, instead of transparent glass fiber), and (2) the dielectric thickness being not optimized to make the reflective color matching between bulk and pattern lines. If a 20-micrometer or thinner glass fiber (transparent materials) is applied, and if the dielectric thickness is optimized, the invisible line mark can be achieved during the inspection at a 90° angle.

Pattern lines can be tested for electrical conductivity, which is another method for evaluating the signal transmission of a structure. If the patterned structure is not conductive, then this low-E coating is transmissive to cellular signals. Thus, the electrical resistance of a patterned structure, which can be measured (e.g., by a multimeter), is a good indicator of cellular signal transmission of an assembly comprising this patterned structure.

Conventional pattern lines, which are formed using conventional lithographic equipment and techniques, e.g., without additional treatment, are not sufficient for cell phone signal transmission. Specifically, these conventional pattern lines do not have an undercut, unlike the structure shown in FIG. 6E. Without an undercut, a low-E stuck, which is formed over pattern lines, does not form separately in a conductive layer. As such, the conductive layer remains continuous (as opposed to being broken down into multiple disjoined structures), which is evidenced by high conductivity. For example, a test was performed to compare conventional pattern lines (without an undercut) to test lines (with an undercut). A low-E stuck formed over the conventional pattern lines demonstrated resistance of less than 50 Ohm. A low-E stuck formed over the pattern lines with undercuts demonstrated resistance of more than 20 Mega Ohms. The undercut amount was more than 100 nm, which is defined as the average amount of difference along the pattern line, between the line width at the top and the smallest line width at any height from the bottom to the top. If in the photoresist cross-section picture, the line that connected the edge of the top corner to the undercut bottom corner, can form an angle to the substrate surface, as shown in FIG. 6E, and this angle can be smaller than 88° (degrees) or at least smaller than 80° (degree).

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered illustrative and not restrictive.

What is claimed is:

1. An energy-efficient signal-transparent window assembly comprising:
    a window substrate;
    non-conductive spacers, forming a pattern on the window substrate, interfacing a portion of the window substrate, and blocking the portion of the window substrate;
    a first dielectric layer, comprising a plurality of first dielectric portions, interfacing the window substrate, and a plurality of second dielectric portions, each of which interfacing a respective one of the non-conductive spacers;
    a conductive layer, formed by multiple disjoined structures defined by the pattern of the non-conductive spacers, wherein:
        the multiple disjoined structures comprise a plurality of first structures and a plurality of second structures,
        each of the plurality of first dielectric portions is disposed between a respective one of the plurality of first structures and the window substrate, and
        each of the plurality of second dielectric portions is disposed between a corresponding one of the plurality of second structures and a corresponding one of the non-conductive spacers;
    a barrier layer, comprising a plurality of first barrier portions and a plurality of second barrier portions,
    such that each of the plurality of first structures is disposed between a corresponding one of the plurality of first dielectric portions and a corresponding one of the plurality of first barrier portions and
    such that each of the plurality of second structures is disposed between a corresponding one of the plurality of second dielectric portions and a corresponding one of the plurality of second barrier portions,
        wherein the barrier layer is formed from a material comprising nickel, and
        wherein each of the plurality of first barrier portions extends to and directly contacts the window substrate and forms at least a portion of a corresponding one of a plurality of sidewalls; and
    a second dielectric layer, disposed over the barrier layer.

2. The energy-efficient signal-transparent window assembly of claim 1, wherein the non-conductive spacers comprise one or more of photoresist, fibers, wires, and transparent material.

3. The energy-efficient signal-transparent window assembly of claim 1, wherein the non-conductive spacers comprise a positive photoresist.

4. The energy-efficient signal-transparent window assembly of claim 1, wherein:
    the first dielectric layer, the conductive layer, the barrier layer, and the second dielectric layer form substrate-interfacing stacks and spacer-interfacing stacks;
    each of the substrate-interfacing stacks interfaces the window substrate and is positioned between two adjacent ones of the non-conductive spacers; and
    the spacer-interfacing stacks are positioned such that the non-conductive spacers are disposed between the spacer-interfacing stacks and the window substrate.

5. The energy-efficient signal-transparent window assembly of claim 4, wherein the substrate-interfacing stacks are disjoined from the spacer-interfacing stacks.

6. The energy-efficient signal-transparent window assembly of claim 4, wherein the non-conductive spacers protrude between and above the substrate-interfacing stacks.

7. The energy-efficient signal-transparent window assembly of claim 4, wherein the non-conductive spacers have a height at least greater than a height of the substrate-interfacing stacks.

8. The energy-efficient signal-transparent window assembly of claim 1, wherein:
    each of the non-conductive spacers has a substrate-interfacing surface and a dielectric-interfacing surface, opposite of the substrate-interfacing surface; and
    a width of the dielectric-interfacing surface is larger than a width of the substrate-interfacing surface.

9. The energy-efficient signal-transparent window assembly of claim 8, wherein a difference between the width of the dielectric-interfacing surface and the width of the substrate-interfacing surface is at least 100 nanometers.

10. The energy-efficient signal-transparent window assembly of claim 8, wherein:
    each of the non-conductive spacers comprises a spacer base and a spacer head;
    the spacer base defines the first spacer surface; and
    the spacer head defines the second spacer surface and is formed from a material different than the spacer base.

11. The energy-efficient signal-transparent window assembly of claim 1, wherein each of the non-conductive spacers is disposed between two adjacent ones of the plurality of sidewalls.

12. The energy-efficient signal-transparent window assembly of claim 11, wherein each of two adjacent sidewalls of the plurality of sidewalls is formed at least by both a corresponding one of the plurality of barrier portions and the second dielectric layer.

13. The energy-efficient signal-transparent window assembly of claim 1, wherein:
    the first dielectric layer, the conductive layer, the barrier layer, and the second dielectric layer form substrate-interfacing stacks and spacer-interfacing stacks; and
    each of the substrate-interfacing stacks and spacer-interfacing stacks is covered by one or more additional stacks, each comprising the first dielectric layer, the conductive layer, the barrier layer, and the second dielectric layer.

14. The energy-efficient signal-transparent window assembly of claim 1, further comprising a second continuous conductive layer, wherein:
the multiple disjoined structures form a patterned portion of the energy-efficient signal-transparent window assembly; and
the second continuous conductive layer is located on a non-patterned portion of the energy-efficient signal-transparent window assembly.

15. The energy-efficient signal-transparent window assembly of claim 1, wherein the non-conductive spacers comprise an organic material.

16. The energy-efficient signal-transparent window assembly of claim 1, wherein the non-conductive spacers have an electrical conductivity of less than 1 S/M.

17. The energy-efficient signal-transparent window assembly of claim 1, wherein the non-conductive spacers have an extinction coefficient of less than 0.1 at 550 nm wavelength.

18. The energy-efficient signal-transparent window assembly of claim 1, wherein the barrier layer has a thickness, at sidewalls and in a direction parallel to a surface of the window substrate, of at least 0.3 nanometers.

19. The energy-efficient signal-transparent window assembly of claim 1, wherein the second dielectric layer has a thickness, at sidewalls and in a direction parallel to a surface of the window substrate, of at least 2 nanometers.

20. The energy-efficient signal-transparent window assembly of claim 14, wherein the non-patterned portion forms at least 5% of an area of the energy-efficient signal-transparent window assembly.

\* \* \* \* \*